United States Patent
Chari et al.

(10) Patent No.: US 7,920,860 B2
(45) Date of Patent: Apr. 5, 2011

(54) SYSTEM FOR MANAGING THE MULTIPLE AIR-TO-GROUND COMMUNICATIONS LINKS ORIGINATING FROM EACH AIRCRAFT IN AN AIR-TO-GROUND CELLULAR COMMUNICATION NETWORK

(75) Inventors: Anand K. Chari, Bartlett, IL (US); Harold Grant Saroka, Ashburn, VA (US); Tim Joyce, Naperville, IL (US); Patrick J. Walsh, Naperville, IL (US); Yong Liu, Schaumburg, IL (US); Daniel Bernard McKenna, Vail, CO (US)

(73) Assignee: AirCell LLC, Itasca, IL (US)

( * ) Notice: Subject to any disclaimer, the term of this patent is extended or adjusted under 35 U.S.C. 154(b) by 296 days.

(21) Appl. No.: 11/590,709

(22) Filed: Oct. 31, 2006

(65) Prior Publication Data

US 2008/0102814 A1    May 1, 2008

(51) Int. Cl.
*H04W 4/00* (2009.01)
*H04W 24/00* (2009.01)
*H04M 1/00* (2006.01)

(52) U.S. Cl. ............. 455/431; 455/422.1; 455/423; 455/424; 455/562.1

(58) Field of Classification Search ............ 455/422.1, 455/423–424, 431, 379, 63.1, 562.1
See application file for complete search history.

(56) References Cited

U.S. PATENT DOCUMENTS

| | | | |
|---|---|---|---|
| 5,359,338 A * | 10/1994 | Hatcher et al. | 343/778 |
| 6,324,398 B1 | 11/2001 | Lanzerotti et al. | |
| 6,418,327 B1 * | 7/2002 | Carey et al. | 455/562.1 |
| 2004/0142658 A1 * | 7/2004 | McKenna et al. | 455/11.1 |
| 2004/0253951 A1 * | 12/2004 | Chang et al. | 455/431 |
| 2005/0213527 A1 * | 9/2005 | Xie | 370/315 |
| 2005/0221875 A1 | 10/2005 | Grossman et al. | |
| 2006/0178143 A1 * | 8/2006 | Chang et al. | 455/431 |
| 2008/0122706 A1 * | 5/2008 | Jalali | 343/703 |

* cited by examiner

Primary Examiner — Jinsong Hu
Assistant Examiner — Omoniyi A Obayanju
(74) Attorney, Agent, or Firm — Patton Boggs LLP

(57) ABSTRACT

The Multi-Link Aircraft Cellular System makes use of multiple physically separated antennas mounted on the aircraft, as well as the use of additional optional signal isolation and optimization techniques to improve the call handling capacity of the Air-To-Ground cellular communications network. These additional techniques can include polarization domain and ground antenna pattern shaping (in azimuth, in elevation, or in both planes). Further, if code domain separation is added, dramatic increases in capacity are realized. Thus, the Air-To-Ground cellular communications network can increase its capacity on a per aircraft basis by sharing its traffic load among more than one cell or sector and by making use of multiple physically separated antennas mounted on the aircraft, as well as the use of additional optional signal isolation and optimization techniques.

20 Claims, 35 Drawing Sheets

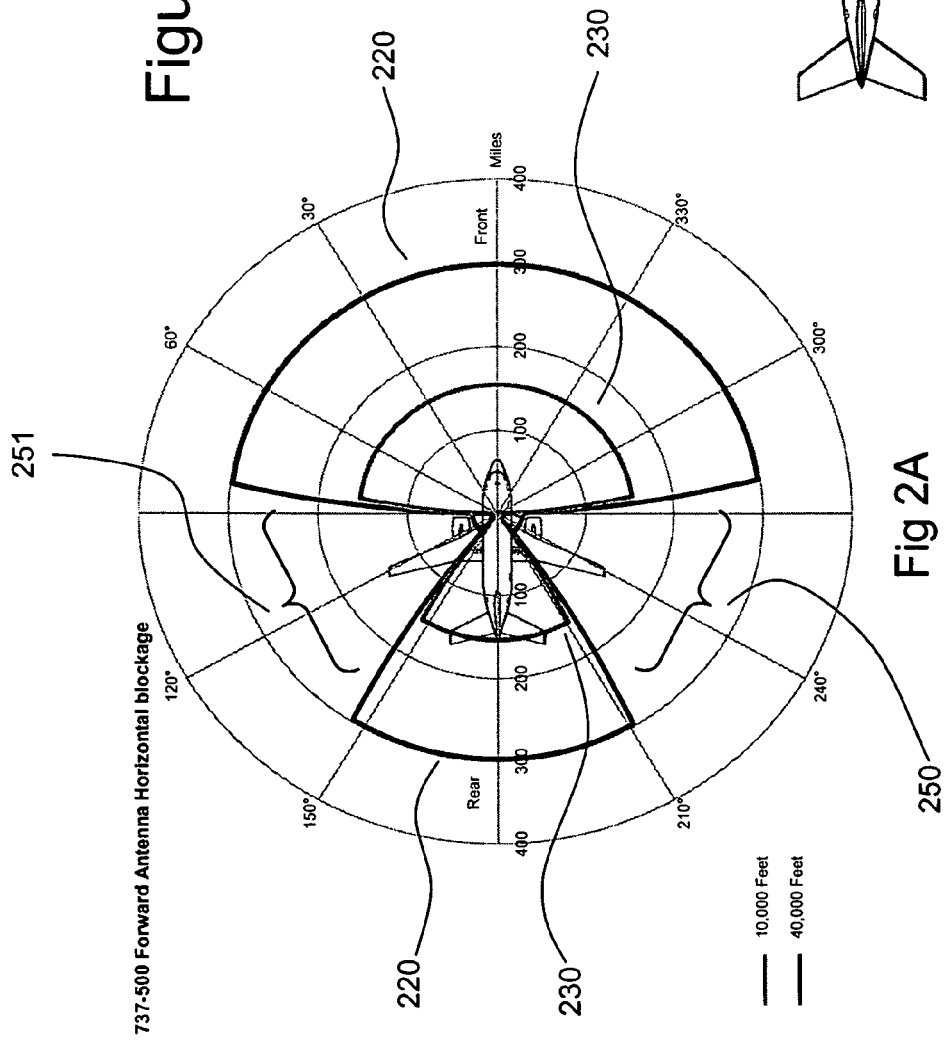
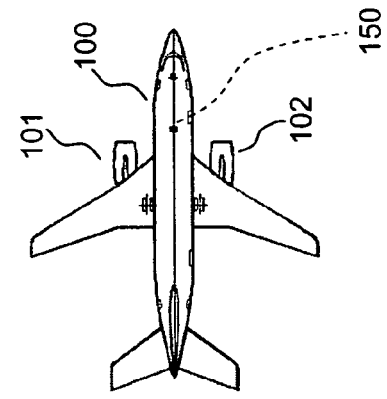
Figure 2

Figure 3
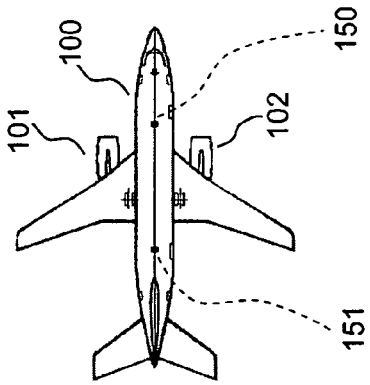
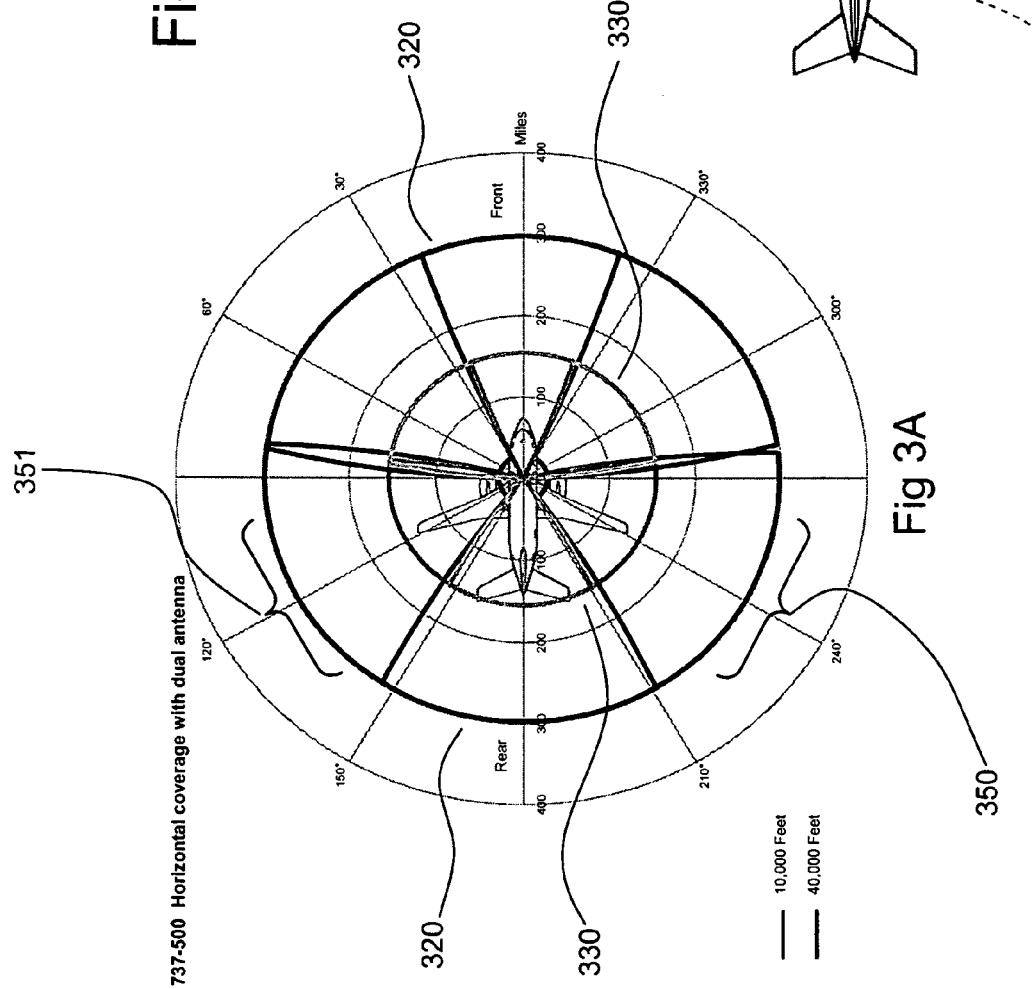

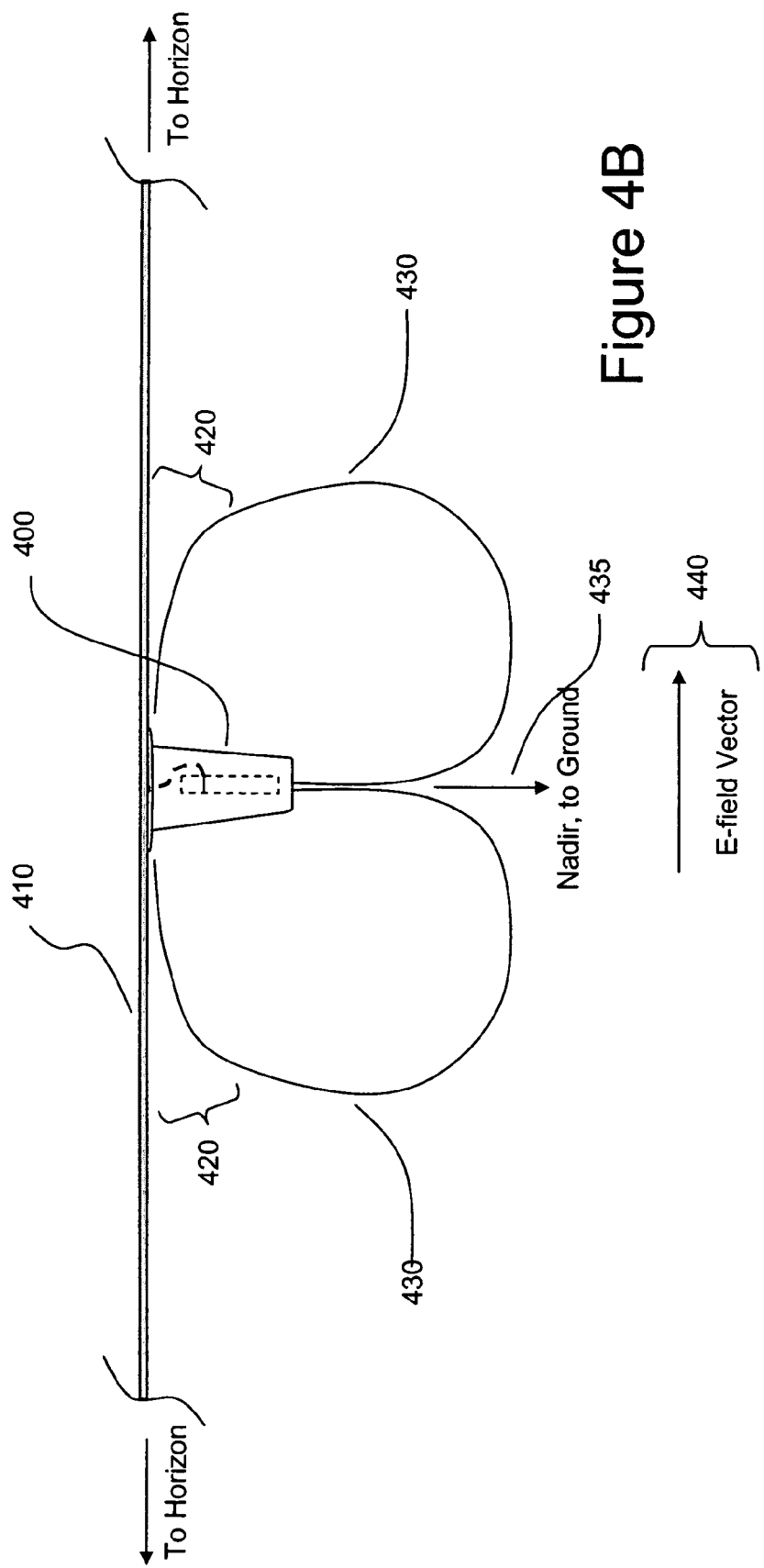

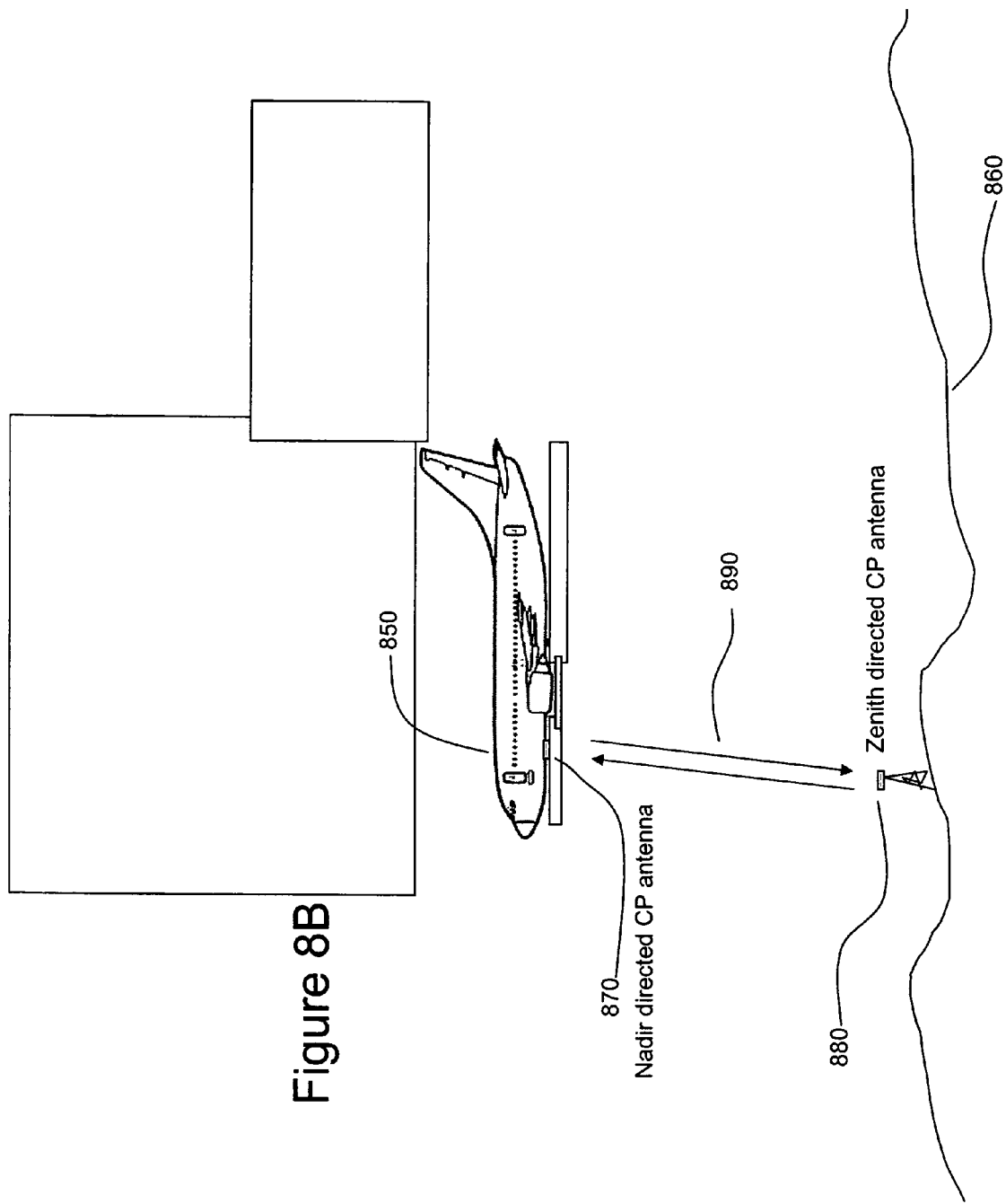

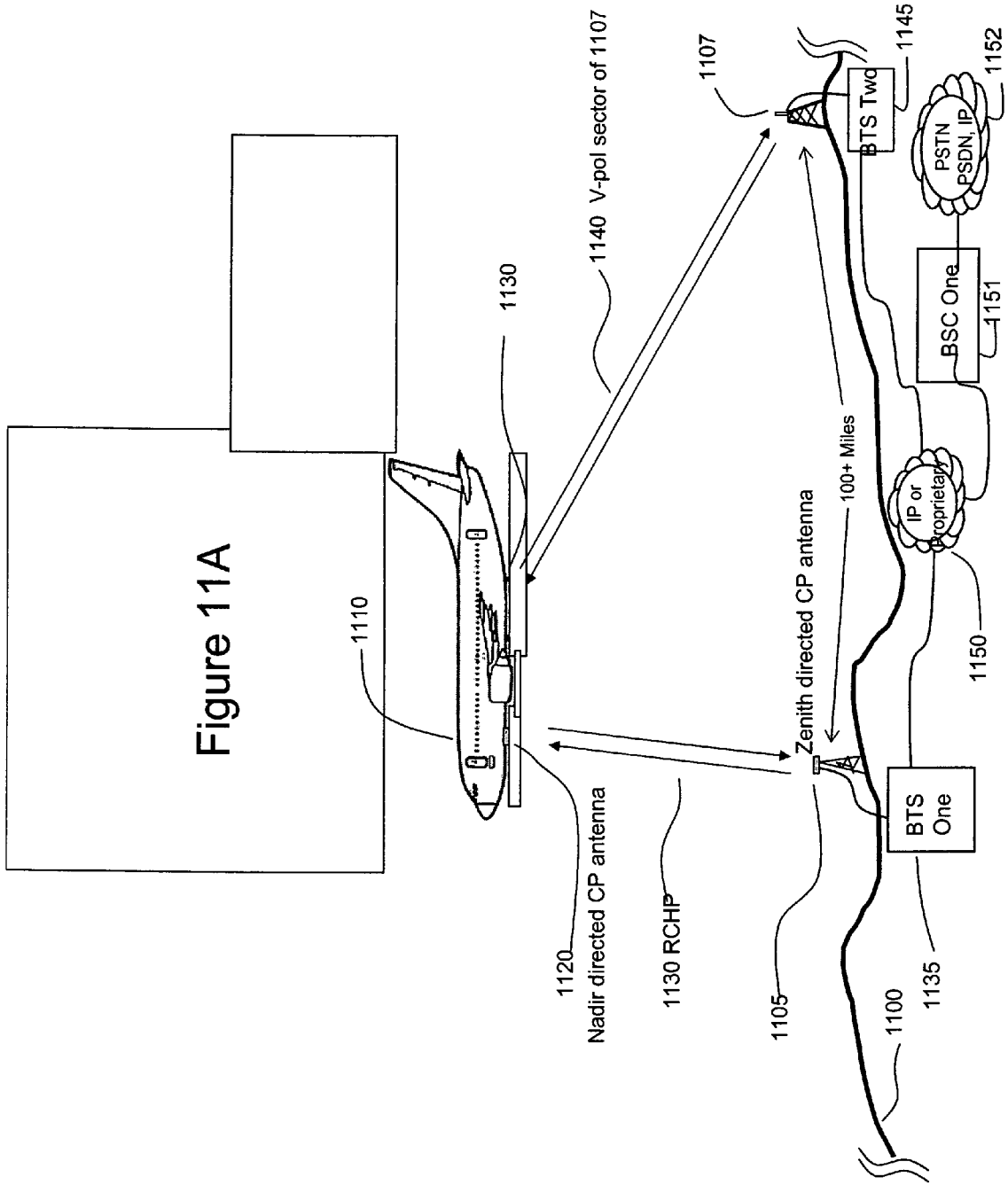

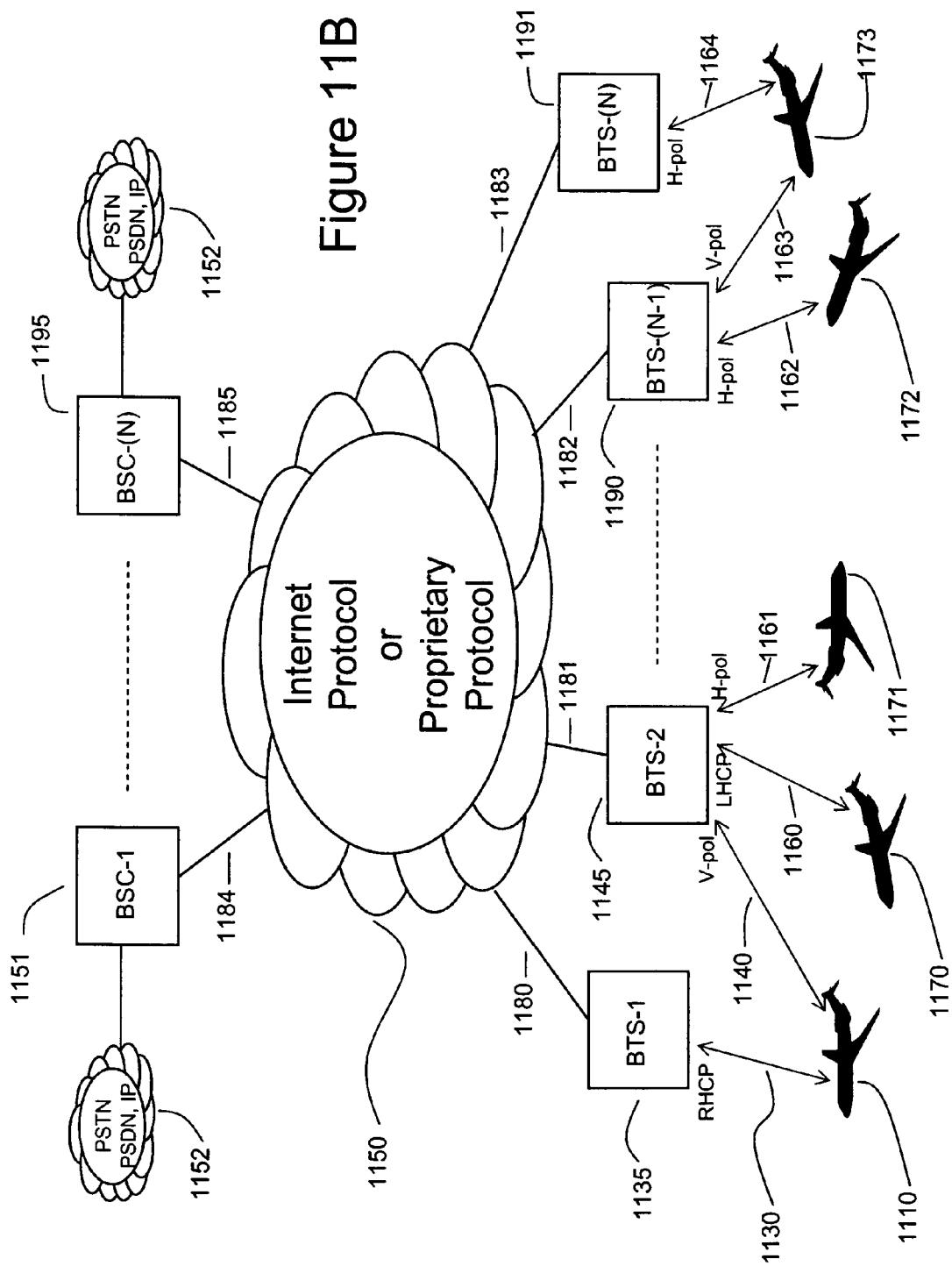

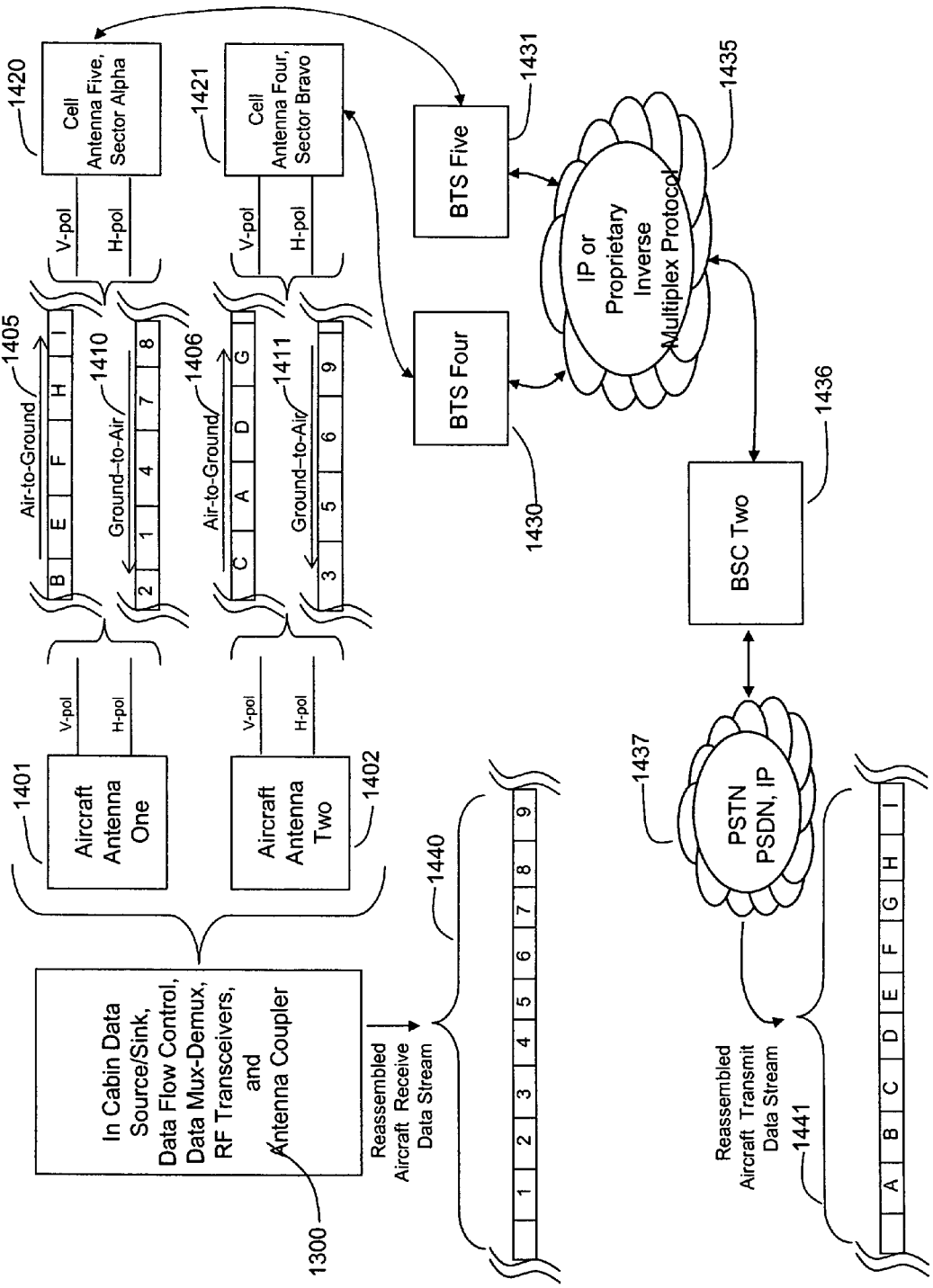
Figure 14A1

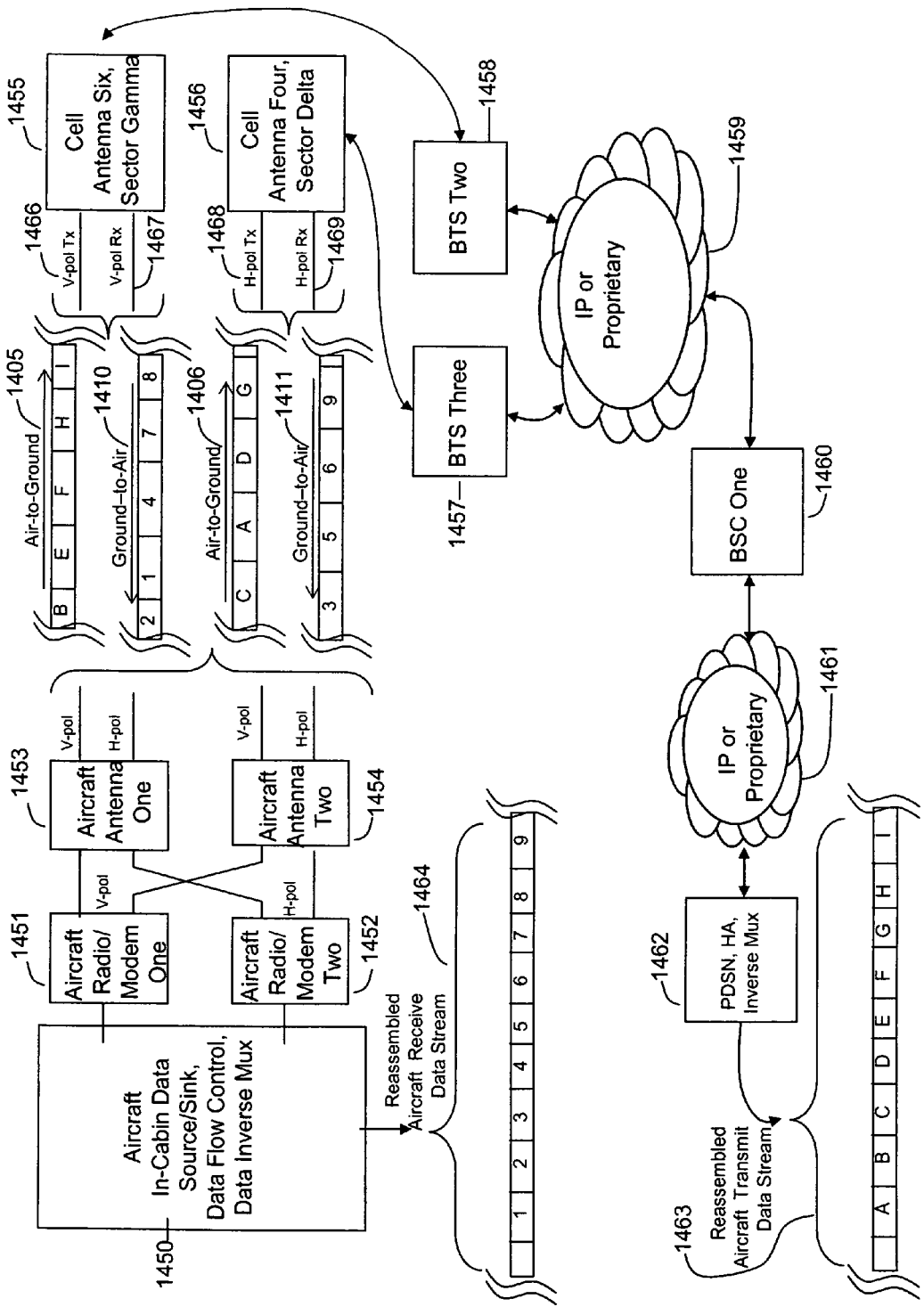
Figure 14A2

SYSTEM FOR MANAGING THE MULTIPLE AIR-TO-GROUND COMMUNICATIONS LINKS ORIGINATING FROM EACH AIRCRAFT IN AN AIR-TO-GROUND CELLULAR COMMUNICATION NETWORK

CROSS-REFERENCE TO RELATED APPLICATIONS

This application is related to an application titled "Air-To-Ground Cellular Communication Network Terrestrial Base Station Having Multi-Dimensional Sectors With Alternating Radio Frequency Polarizations" filed on the same date as the present application, and to an application titled "Multi-Link Aircraft Cellular System For Simultaneous Communication With Multiple Terrestrial Cell Sites" filed on the same date as the present application.

FIELD OF THE INVENTION

This invention relates to cellular communications and, in particular, to a system for providing multiple Radio Frequency communication links simultaneously between the aircraft and multiple terrestrial cell sites.

BACKGROUND OF THE INVENTION

It is a problem in the field of cellular communications to efficiently and continuously meet the communications requirements of the passengers in multiple aircraft as the aircraft fly their routes and approach/depart airports.

A typical Air-To-Ground cellular communications network (including the Ground-To-Air link consists of a number of terrestrial (ground) base stations, each of which provides a radio frequency coverage area in a predetermined volume of space, radially arranged around the cell site transmitting antenna. This terrestrial base station uses an antenna pattern which is insensitive to the reception of ground-originating or ground-reflected signals and which antenna pattern is transmissive only in a skyward direction. The terrestrial base stations are geographically distributed, generally following a typical cellular communications network layout. Terrestrial base stations can also be co-located near airports to enable network coverage when aircraft are on the ground; in this case, the antenna patterns are optimized for terrestrially located aircraft. The boundaries of the coverage area of each terrestrial base station are substantially contiguous with that of neighboring sites so that the composite coverage of all of the terrestrial base stations in the Air-To-Ground cellular communications network generally provides coverage over the targeted area. Terrestrial base stations may provide either a single omni cell of coverage using transceiver(s) associated with a single transmit and receive antenna system or multiple sectors within the cell of coverage, each with associated transceivers and the associated transmit and receive antennas. The advantage of the latter arrangement, with multiple sectors per terrestrial base station, is to allow provision of increased call handling capacity in the coverage area of that terrestrial base station.

There are limitations on the total radio frequency spectrum available and, therefore, limitations on the total available call handling capacity in any single cell. As a wireless communications device moves from the coverage area of one cell or a cell's sector into the coverage area of a spatially contiguous adjacent cell or cell's sector, the communications from that wireless communications device are handed over from the first cell (or first sector) to the second cell (or second sector). This requires that there be adequate available call handling capacity in the second cell to support the new load represented by this wireless communications device. Gall handoffs that entail a single personal wireless communications device do not create large transient loads on a cell. However, in an Air-To-Ground cellular communications network, the number of presently active cellular calls within an aircraft may represent a large fraction of the call handling capacity of a terrestrial cell site since each aircraft may have hundreds of passengers, each vying for network capacity. With the small number of aircraft that can be served by a cell site and long average transit times for aircraft within a cell, there must be a large allowance of idle capacity to serve aircraft which may arrive before the presently served aircraft leave the cell and free up call handling capacity within the cell. In addition, the use of the single radio frequency link between the aircraft and the serving terrestrial cell site represents a single point of failure, where a service interruption impacts a multitude of calls.

Thus, the radio frequency communications link between the aircraft and the terrestrial base stations of the Air-To-Ground cellular communications network has limited capacity, represents a single point of failure, and represents a call handoff problem in terms of call handling capacity of the serving terrestrial cell sites.

What is needed is an advance in the art which solves the Air-To-Ground cellular communications network call handling capacity problem and dramatically improves system availability, system reliability, and system capacity.

BRIEF SUMMARY OF THE INVENTION

The above-described problems are solved by the present Multi-Link Aircraft Cellular System For Simultaneous Communication With Multiple Terrestrial Cell Sites, termed the "Multi-Link Aircraft Cellular System" herein.

In this technical description, an "Air-To-Ground" cellular communications network is considered to be bi-directional and includes the Ground-To-Air direction to create a full duplex wireless communication link Thus the description, Air-To-Ground, also includes the Ground-To-Air direction herein.

A bandwidth constrained Air-To-Ground cellular communications network can increase its call handling capacity on a per aircraft basis by sharing the aircraft's traffic load among more than one cell or sector. This process works by simultaneously communicating the aircraft's call traffic through more than one Air-To-Ground Radio Frequency communications link to multiple terrestrial cells or sectors (or sectors of a given cell). For a given Radio Frequency spectrum allocation, spreading the call traffic over multiple Air-To-Ground Radio Frequency communications links to multiple terrestrial cells or sectors multiplies the call handling capacity to/from a given aircraft for each additional Radio Frequency link implemented (if no other aircraft were vying for the capacity of these cells or sectors). Equally important, this architecture removes the single point of failure problem occasioned by a single Air-To-Ground Radio Frequency communications link thereby rendering the network availability of the composite Air-To-Ground Radio Frequency communications link substantially higher and more robust. Even if the Air-To-Ground cellular communications network were busy or heavily congested with multiple aircraft in a given region of space, this process still increases the overall traffic throughput to a given aircraft by "smoothing" out the aggregate network load across multiple terrestrial cells as all of the aircraft in the service area individually and collectively vary their demands for network capacity.

In order to increase the capacity, availability, and reliability of a bandwidth constrained wireless Air-To-Ground network, other methods are necessary to parse the usable spatial and temporal multi-dimensional region where aircraft are operating. These methods include using two substantially orthogonal polarizations to effectively double the capacity of a given spectral allocation. Further, if Walsh code domain separation is added, additional increases in the call handling capacity of the Air-To-Ground cellular communications network are realized.

The implementation of the present Multi-Link Aircraft Cellular System makes use of multiple physically separated antennas mounted on the aircraft as well as the use of additional optional signal isolation and optimization techniques to improve the call handling capacity of the Air-To-Ground cellular communications network On the ground, base station antenna pattern shaping in azimuth, in elevation, in altitude, or in multiple planes further segments the multi-dimensional spatial region into multiple sectors, thereby improving system capacity through spatial frequency re-use.

All of the aforementioned capacity enhancement techniques are additive in nature. For example, using substantially orthogonal polarizations together with 6-sector azimuth base station antenna patterns has a linear multiplier effect on overall capacity of that given base station and associated aircraft. When the collective network capacity is considered, the smoothing or balancing of load peaks across multiple nodes provides enhanced peak load management from an overall systems perspective.

Thus, the Air-To-Ground cellular communications network can increase its traffic (data and voice) handling capacity on a per aircraft basis by sharing its traffic load among more than one terrestrial cell or sector and by making use of multiple physically separated antennas mounted on the aircraft and base station antenna pattern sectoring, as well as the use of additional optional signal isolation and optimization techniques such as the use of orthogonal polarizations.

BRIEF DESCRIPTION OF THE DRAWINGS

FIGS. 1A-1C illustrate the side, frontal, and top views of a Boeing 737 aircraft, respectively, FIG. 2A illustrates the Radio Frequency transmission pattern for a forward mounted belly blade antenna on a Boeing 737-500 aircraft, as shown in FIG. 2B, illustrating the blockage of the Radio Frequency signals caused by the engine pods;

FIG. 3A illustrates the Radio Frequency transmission pattern for two aircraft blade antennas, one mounted forward and one mounted aft on a Boeing 737-500 aircraft, as shown in FIG. 3B;

FIG. 4B illustrates the Radio Frequency radiation pattern for the belly mounted blade antenna of FIG. 4A, with a horizontal E-field and radiated far field pattern over a conductive surface with pattern nulls in the plane of the conductive surface;

FIG. 8B illustrates conformal micro-strip patch antennas (or arrays), which are circularly polarized, mounted on the belly of an aircraft, with the antennas being nadir (ground) pointing (this aircraft antenna is paired with a zenith (sky) pointed at the base station);

FIG. 11A illustrates an example where two antennas, a conformal micro-strip patch antenna and a blade antenna, are mounted on the belly of the aircraft to support two Air-To-Ground Radio Frequency communications links with two different Air-To-Ground terrestrial base stations;

FIG. 11B illustrates a generalized view of the Air-To-Ground cellular communications network, serving multiple aircraft, each of which is connected via at least one Air-To-Ground Radio Frequency communications link;

FIG. 14A1 illustrates how the multi-link capability results in inverse multiplexing on both the forward and reverse paths between the aircraft and the terrestrial base stations where the out-of order data packets are re-assembled in correct order, both at the aircraft and on the ground, before delivery to the selected destination, FIG. 14A2 is a modification of FIG. 14A1 showing a specific application where the terrestrial sectors are like polarized in transmit and receive and the aircraft antenna connections to the aircraft transceivers enable diversity receive through connection matrix M×N, and FIG. 14A1 also moves the location of the PDSN-Inverse Multiplex functionality further downstream so that the BTS to BSC inter-connection proprietary protocols do not have to be modified (thereby speeding time to market and reducing development cost);

DETAILED DESCRIPTION OF THE INVENTION

Figure 1:
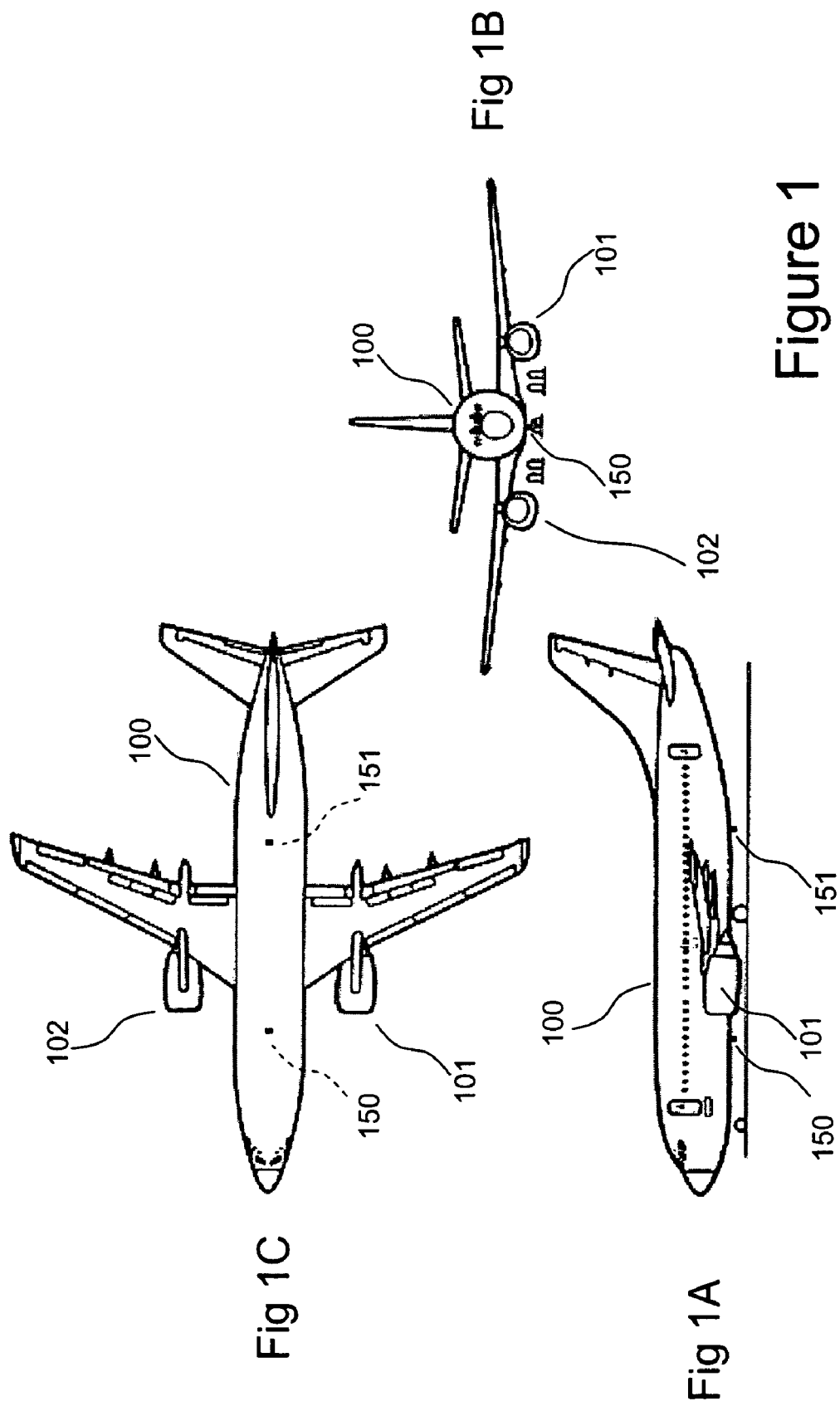

The provision of highly reliable and highly available Air-To-Ground cellular communications service is a complex process, since many of the components of the Air-To-Ground cellular communications network interact and influence the composite overall Air-To-Ground cellular communications network traffic handling capacity (data, voice, other). Changing a network component may improve one network attribute but simultaneously impair another. From a systems perspective, the network design should have both high reliability and high availability as well as have high traffic capacity. To operationally manage these attributes, the network architecture should be capable of being scaled up over time to incrementally add traffic capacity.

Call Handling Capacity Enhancement Problem

In particular, the issue of capacity enhancement for Air-To-Ground cellular communications networks is an acute problem, since the Air-To-Ground Radio Frequency communications link represents a fixed bandwidth resource. The capacity enhancement problem is even more complex since the cellular communications network serves airborne aircraft in a multi-dimensional space which has varying aircraft spatial densities; in particular, in and around airports the aircraft spatial density can be high. These aircraft are flying at high speeds incurring associated doppler shift as well as time delay associated with large cell radii. The aircraft flight profiles include varying pitch-roll-yaw angles, different altitudes, and different velocities. Each aircraft appears as a single "node" from the perspective of the terrestrial base stations. As a single node, each aircraft, containing possibly hundreds of passengers, appears to the terrestrial base station(s) as a very large capacity, single point network load. Each unique passenger potentially has a wireless device which has specific data and/or voice requirements which, when multiplied by the number of passengers' wireless devices, can generate a significant traffic load on a per aircraft basis. In any given region, there could be tens of aircraft, each individually having a large traffic load, all aircraft in aggregate vying for network resources from the Air-To-Ground cellular communications network through limited frequency bandwidth Air-To-Ground Radio Frequency communications links.

Aircraft Antenna Systems

The inverse multiplex system using multiple links described herein relies heavily on the Air-To-Ground system advantage that radiated polarizations remain pure in their radiated sense and do not experience polarization vector rotation due to physical object scattering (as happens in a terrestrial cellular network communicating with terrestrial mobile devices (cell phones)). This is because the propagation path in the Air-To-Ground network is Line-Of-Sight (LOS) and does not have any natural or manmade objects to diffract, reflect, refract, or otherwise impair the RF propagation (radiated and arrival polarizations remain constant) between the aircraft and the ground (or likewise, between the ground and the aircraft). Thus, the Air-To-Ground network is capable of excellent polarization isolation between two polarization types that are predominantly orthogonal. Examples of orthogonal polarizations include vertical polarization to horizontal polarization and right hand circular polarization to left hand circular polarization. Systems level high frequency electromagnetics computer modeling, as well as field measurements, indicates the orthogonal polarization isolation is typically in the 12 dB to 15 dB range. This isolation level is more than sufficient to use polarization as a key element to enhance system capacity (as well as minimize intra-network or self-network interference). However, to date, all Air-To-Ground communication systems for consumer communications services have always been uni-polarized; either exclusively vertical polarization or exclusively horizontal polarization. Historically, the Air-To-Ground uni-polarization has been network wide and all aircraft have operated on the same polarization, either all are vertically polarized or all or horizontally polarized. An aircraft enabled to operate on Network 1 which, for example, is vertically polarized cannot operate on Network 2 which, in this example, is horizontally polarized. The invention described herein takes advantage of using substantially orthogonal polarizations to manage self-interference of multi-sector base station antenna patterns and thereby dramatically increase system capacity for the same spectral or bandwidth allocation. Of course, sectoring adds its own increase in effective network capacity. However, without the inclusion of polarization isolation, sectoring alone in a bandwidth limited system does not enhance capacity in the Air-To-Ground network Other methods available to create intra-system isolation and thereby further enable sectoring without self-interference include the use of the code domain where substantially orthogonal codes are used in each sector.

The time domain as an isolation method for Air-To-Ground communications is much more complex. Issues include relatively long propagation delays caused by the large distances (more than a hundred miles); and in Line-Of-Sight Air-To-Ground architectures, there is nothing to stop a packet from continuing further in space to potentially interfere with another intended packet hundreds of miles away. In addition, in the time domain it is impossible to synchronize the at-aircraft arrivals of various cells/sectors packets and thereby isolate one packet from another (by timing the packet on-off cycles). Thus, other domains are more preferred: Walsh code, polarization, azimuth sectoring, elevation sectoring, antenna pattern self-isolation, and frequency band selection.

State of the art cellular communications services to airborne aircraft offer unique problems not contemplated in present day terrestrial-based cellular communication networks. For example, antenna systems installed on aircraft must handle not only the extremes of flight (650 miles per hour, temperatures ranging from 120° F. on the ground and then minutes later 40° F. in flight), but also extreme vibration and other environmental hazards. From a wireless communications perspective, these aircraft antenna must radiate specific Radio Frequency (RF) energy patterns with associated electromagnetic polarizations, all from within a very small physical antenna package (the antenna is mounted on the exterior surface of the aircraft and a large physical object creates drag which can significantly impact aircraft fuel economy). The aircraft itself influences the propagation of the Radio Frequency signals from the mounted aircraft antenna through physical blockage of the Radio Frequency signals and non-linear effects on the selected Radio Frequency signal polarization due to the electro-magnetic characteristics of the aircraft itself.

There are a number of antenna types that are optimally suited for aircraft installation: blade style, conformal patch, conformal patch arrays, wire monopole, wire string (HF), metallic slot, and the like. Of these, one of the most common antenna types is the blade antenna which is often mounted on the belly of the aircraft. For blade style antennas, the specific aircraft mounting location may be further limited by other adjacent aircraft antennas or mechanical features of the aircraft, such as aircraft control surfaces and landing gear storage wells. Since the desired Radio Frequency communication path is both Air-To-Ground and the converse path, Ground-To-Air, it is particularly desirable to use a lower aircraft belly mounting location for the blade antenna. When blade antennas are mounted on the belly of a large commercial jet, the aircraft itself begins to impact the Line-Of-Sight (LOS) radio signal propagation path. For instance, in modern jet engine design, the physically large engine nacelle of high bypass jet engines (which achieve higher levels of fuel efficiency) actually hangs below the belly of the aircraft in level flight. The engine nacelle is metallic (conductive) and is not transparent to Radio Frequency energy. Thus, the engine nacelle blocks the Radio Frequency energy transmitted from or received by the belly mounted blade antenna. This Radio Frequency propagation path blockage is significant. Also, in the brief period of flight where the landing gear is down and locked, these mechanical structures also are Line-Of-Sight blockages to Radio Frequency propagation.

Separately, since most aircraft are constructed of a conductive external skin, the physical area of conductive material on an aircraft is electrically large relative to the wavelength of the operating frequency: upper UHF, lower L-band, and higher frequencies. Accordingly, the emitted or received polarization (electromagnetic reciprocity applies) of an aircraft antenna is influenced by this electrically large multidimensional conductive aircraft surface. In particular, Maxwell's equations require that the electrical field strength goes to zero along the surface of electrically large conductors when the E-field vector is parallel to the conductive surface. Thus, aircraft antennas that are polarized in a horizontal plane (i.e., the plane of E-field polarization is parallel to the belly of the aircraft and the plane of the Earth when the aircraft is in level flight) necessarily have pattern roll-off in any direction where a substantially horizontal conductive aircraft surface exists. Furthermore, this pattern roll-off is more pronounced the more conductive material is present. For example, a belly mounted horizontally polarized aircraft antenna experiences considerable pattern roll-off at the horizon looking fore and aft along the length of the aircraft belly. Aircraft wings also have some impact, although this impact is less pronounced since the wing's conductive surface is generally above the horizon's horizontal plane of propagation (the look angle for an aircraft at altitude to its serving cell or sector is just a few degrees).

These issues, blockage and polarization pattern effects, dramatically influence availability of the Air-To-Ground cellular communications network through a temporary loss of Radio Frequency signal propagation path. These same issues also influence the aggregate call handling capacity of the Air-To-Ground cellular communications network to/from a given aircraft. For time or latency sensitive communications, such as a voice call, these issues can make a voice telephone call literally impossible. For data applications, such as Internet access, the loss of system capacity is unacceptable, given that there are hundreds of passengers being multiplexed onto the same Air-To-Ground Radio Frequency communications link Call Handoffs Current terrestrial wireless cellular techniques to manage loss of propagation often include handing the call off to an adjacent cell or cell-sector that has a better signal. Such terrestrial handoff methods are well known in the art. This handoff could be "hard" (make-then-break), "soft" (carrying the connection via two or more cells at the same time), or "softer" (carrying the connection between two or more sectors of a given cell). However, for an Air-To-Ground cellular communications network, the cell site physical locations are hundreds of miles apart, meaning a viable handoff, hard or soft or softer, may not be available for a single belly mounted aircraft antenna which is experiencing an impaired Radio Frequency cellular communications link for whatever period of time. In fact, if the aircraft is at altitude in straight and level flight, this impairment time could be untenably long.

Separately, the use of fixed Radio Frequency spectrum allocation in Air-To-Ground cellular communications networks is inherently capacity limited. Shannon's Law defines how many bits per hertz of capacity can be maximally realized. Thus, other methods are necessary to realize enhanced overall system capacity. While some of the known methods to improve system capacity (taken from terrestrial cellular systems design concepts) are available to Air-To-Ground cellular communications networks, in reality the Air-To-Ground environment is unique and offers unique attributes that can be capitalized on. For instance, in the polarization domain, an Air-To-Ground cellular communications network generally has Line-Of-Sight (LOS) propagation. Aircraft are generally in straight and level flight; even when turning or climbing/descending, the flight angles that commercial aircraft incur are not pronounced. Thus, the measured polarization isolation between horizontal and vertical polarizations is 12 dB to 15 dB (not possible in pure terrestrial cellular networks). In addition, the Line-Of-Sight condition enables the direct propagation of Radio Frequency communications links to multiple cells or sectors at the same time for nearly all phases of flight; again, something that is generally not possible in terrestrial cellular networks except when a terrestrial mobile terminal device is in a handoff (handover) region. Finally, the Air-To-Ground terrestrial base station antenna patterns can be shaped in two planes, both elevation and azimuth. Since there is nothing to interfere with these patterns, like a building or tunnel does for terrestrial cellular, pattern shaping offers a means to parse the three-dimensional space into smaller regions, thereby multiplying the fixed spectrum allocation many times over.

Issues

There are three significant propagation issues that can influence the Air-To-Ground Radio Frequency communications link performance: Line-Of-Sight shadowing due to aircraft engine-pod blockages, horizontal polarization pattern nulling along conductive surfaces, and intra-system co-channel (co-frequency) interference.

Line-of-Sight Shadowing

The first issue discussed herein is Line-Of-Sight Shadowing. FIGS. 1A-1C illustrate the side, frontal, and top views of a dual engine Boeing 737 aircraft, respectively. On some types of aircraft (e.g., Boeing 737,757), the engine pods 101, 102 extend below the bottom of the fuselage 100 where the antenna 150, 151 for the Air-To-Ground cellular communications network is mounted. This engine pod configuration can result in Line-Of-Sight blockage of the Radio Frequency signals from the antenna 150, 151 to the serving terrestrial cell (not shown).

The maximum Radio Frequency coverage range for an aircraft mounted antenna is determined by the radio horizon, using 4/3 Earth curvature calculation where there is no engine pod blockage. In the horizontal direction, where there is engine pod blockage, the Line-Of-Sight coverage is determined by the elevation angle, theta from the ground to aircraft where the elevation angle must be greater than the vertical angle of the aircraft antenna clearing the engine pod. For a Boeing 737-500 aircraft, this vertical angle is 15.5 degrees. Therefore, vertical angle along with aircraft altitude determines the maximum Line-Of-Sight coverage range in the horizontal shadowed region. At an altitude of 10,000 feet, the coverage range in the shadowed region is 7 miles for Boeing 737-500 aircraft, while, at an altitude of 40,000 fee, the coverage range is 28 miles.

FIG. 2A illustrates the Radio Frequency signal transmission pattern for a forward mounted belly blade antenna 150 on a Boeing 737-500 aircraft, as shown in FIG. 2B, illustrating the blockage of the Radio Frequency signals caused by the engine pods 101, 102. The lines 220 on FIG. 2A illustrate the range of the Radio Frequency signals that emanate from antenna 150 when the aircraft is flying at an altitude of 40,000 feet, while lines 230 on FIG. 2A illustrate the range of the Radio Frequency signals that emanate from antenna 150 when the aircraft is flying at an altitude of 10,000 feet. As can be seen from these antenna patterns, about 35% of the potential Radio Frequency coverage areas of antenna 150, represented by the regions 250, 251, are blocked by the engine pods 101, 102.

The addition of a second belly mounted antenna 151 mounted aft of the midline of the aircraft, which is the point halfway between the nose and the tail of the aircraft, reduces or eliminates the nulls in the Radio Frequency signal transmission pattern of belly mounted antenna 150, as shown in FIG. 2A. FIG. 3A illustrates the composite Radio Frequency signal transmission pattern for two aircraft blade antennas 150, 151, one mounted forward and one mounted aft of the aircraft midline on a Boeing 737-500 aircraft, as shown in FIG. 3B. As can be seen from this Radio Frequency signal transmission pattern, the second belly mounted blade antenna 151 has a Radio Frequency signal transmission pattern that supplements that of the first belly mounted blade antenna 150, thereby to provide more uniform coverage by mitigating the signal blockage caused by the aircraft engine pods 101, 102.

Antenna Combining

Using two antennas on the aircraft mitigates the engine pod blockage problem. However, with dual-polarization antennas there are four antenna feeds from the two antennas. With a single EV-DO modem, the two vertical polarized feeds from the two antennas must be combined, and the two horizontal feeds from the two antennas must be combined prior to input to the EV-DO modem's two Rx inputs. Another option is to use two EV-DO modems. With two modems, there are two possibilities for combining the four antenna feeds. In one option, one modem is connected to both vertical feeds, while the second modem is connected to both horizontal feeds. In the second option, each modem is connected to the vertical and horizontal feed of one of the two antennas.

Option 1—One Modem Connected to Vertical Feeds, One Connected to Horizontal Feeds:

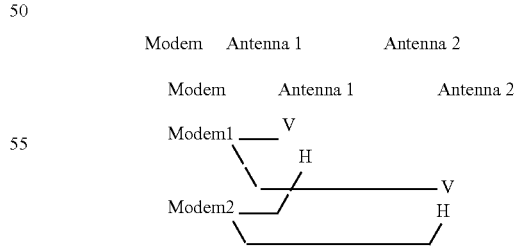

This configuration benefits from the polarization isolation on cell/sector borders. In addition, this option benefits from the fact that each modem is served by different cells/sectors. This allows a single aircraft to have a higher throughput due to a multiplexing gain. However, care must be taken so that a modem being served by a cell with a low SINR does not drag down the performance of the entire cell. One possibility is to only multiplex multiple cells when a minimum data rate (or equivalent quality metric) can be supported from the weaker of the two cells. If the weaker cell did not meet the minimum quality metric, then only the modem served by the stronger cell is used.

Option 2—Each Modem Connected to the Vertical and Horizontal Feeds of One of the Two Antennas:

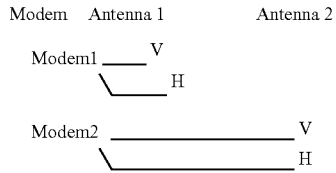

While this option benefits from the polarization isolation on cell/sector borders, it likely does not provide a multiplexing gain. This is because the two modems are always served by the same cell Except when one antenna is blocked) and would be competing with each other for forward link time slots.

Alternatively, a dynamically adaptable "smart" design can optimally select which configuration is best, Option 1 or Option 2. Nothing herein limits the number of antenna on the aircraft to just two. It may be optimal to have more than two aircraft antenna as in FIG. 8A (to be discussed later in this specification).

Typical Blade Antenna Configurations

Figure 4A:
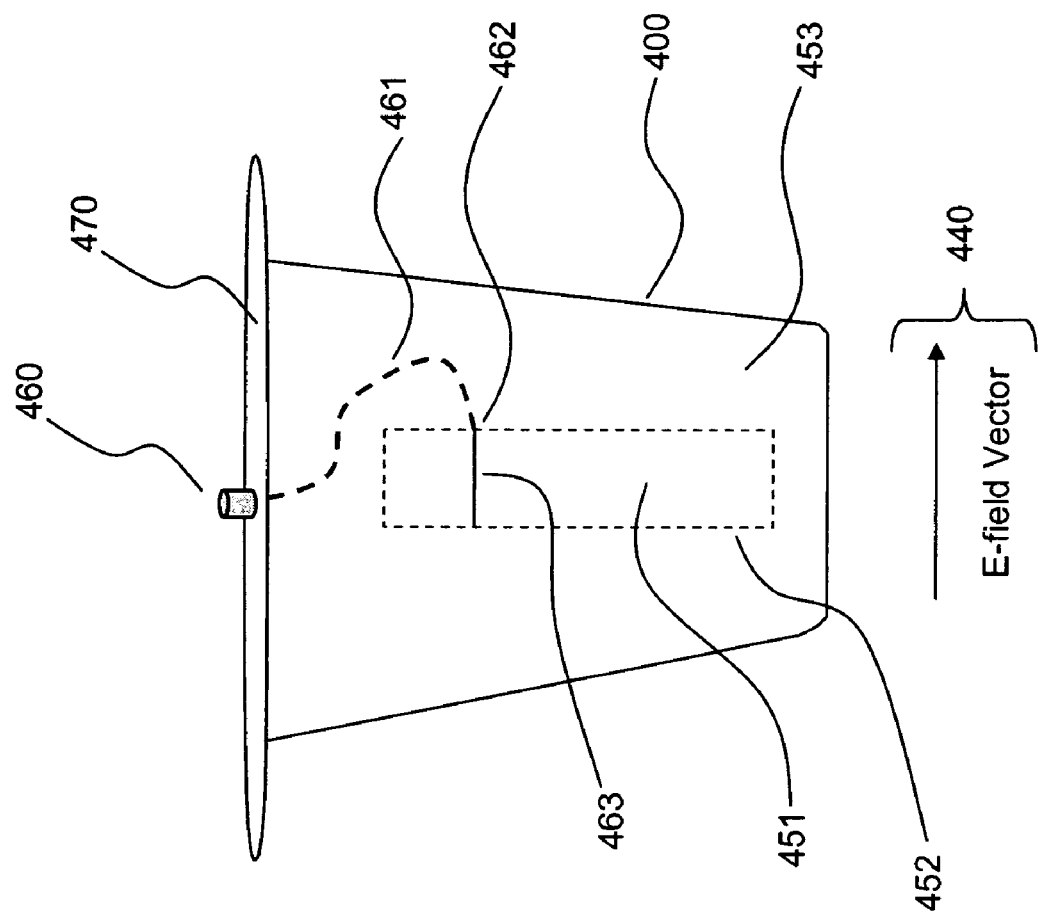
FIG. 4A illustrates a belly mounted blade antenna with a slot antenna radiator that has an E-field vector perpendicular to the slot's long length.

FIG. 4A illustrates a belly mounted blade antenna 400 with a slot (hole) 452 cut into a metallic plate or etched onto a printed circuit board. The RF input-output connector is 460 on mounting flange 470. Coaxial cable 462 feeds the slot at point 460 which is impedance matched. The center conductor of the coaxial cable (which could also be a micro-strip line etched on the opposite side of the etched slot on PCB) continues across the open air slot and attaches to the opposite edge of the slot (electrical connection). Housing 453 is often made of a fiberglass or resin material that is flight worthy yet RF transparent. This antenna 400 generates an electromagnetic field 440 in the horizontal direction 440.

FIG. 4B illustrates the Radio Frequency radiation pattern for the belly mounted blade antenna 400 of FIG. 4A, with a horizontal E-field 440 and radiated far field pattern 430 over a conductive surface 410. The far field pattern of this antenna is shown as 430. The far field pattern is radially symmetric about nadir directed vector 435. The slot far field pattern has a null at nadir 435. Nadir is directed straight downward toward the Earth for an aircraft in level flight. Since the E-field must "short out" at the surface of a like direction conductive surface (per Maxwell's laws), at 420 the horizontally polarized belly mounted blade antenna experiences a pattern null. This pattern null is radially symmetric around the nadir vector 435. The angle and depth of the null at 420 is dependent on the size in wavelengths of the conductive surface it is mounted on. Thus, for a belly mounted antenna, along the length of the fuselage fore and aft, an electrically large conductive presents itself. This conductive surface, for the horizontally polarized antenna as shown in FIG. 4B, causes deep far field pattern nulls long the axis of the plane, fore to aft. Thus, the far field patterns represented in FIGS. 2 and 3 are not representative of a belly mounted horizontally polarized antenna (but would be representative of a vertically polarized belly mounted antenna).

From a geometric perspective, the look angle in the Air-To-Ground network from the aircraft to the ground (and the converse) is a very shallow angle for much of the operating volume of space. Therefore, the pattern null at 420 is a very significant link budget issue. The horizontal polarization effect issue is one that must be considered in the overall systems design of the inverse multiplex, multi-link architecture. In order for the multi-link concept to be optimum, both radiated orthogonal polarizations off of the aircraft should be as "pattern balanced" as possible; that is, their respective far field patterns should be very similar. In other words, neither polarization pattern should have pattern holes in significant regions of space (like 420).

Figure 4C:
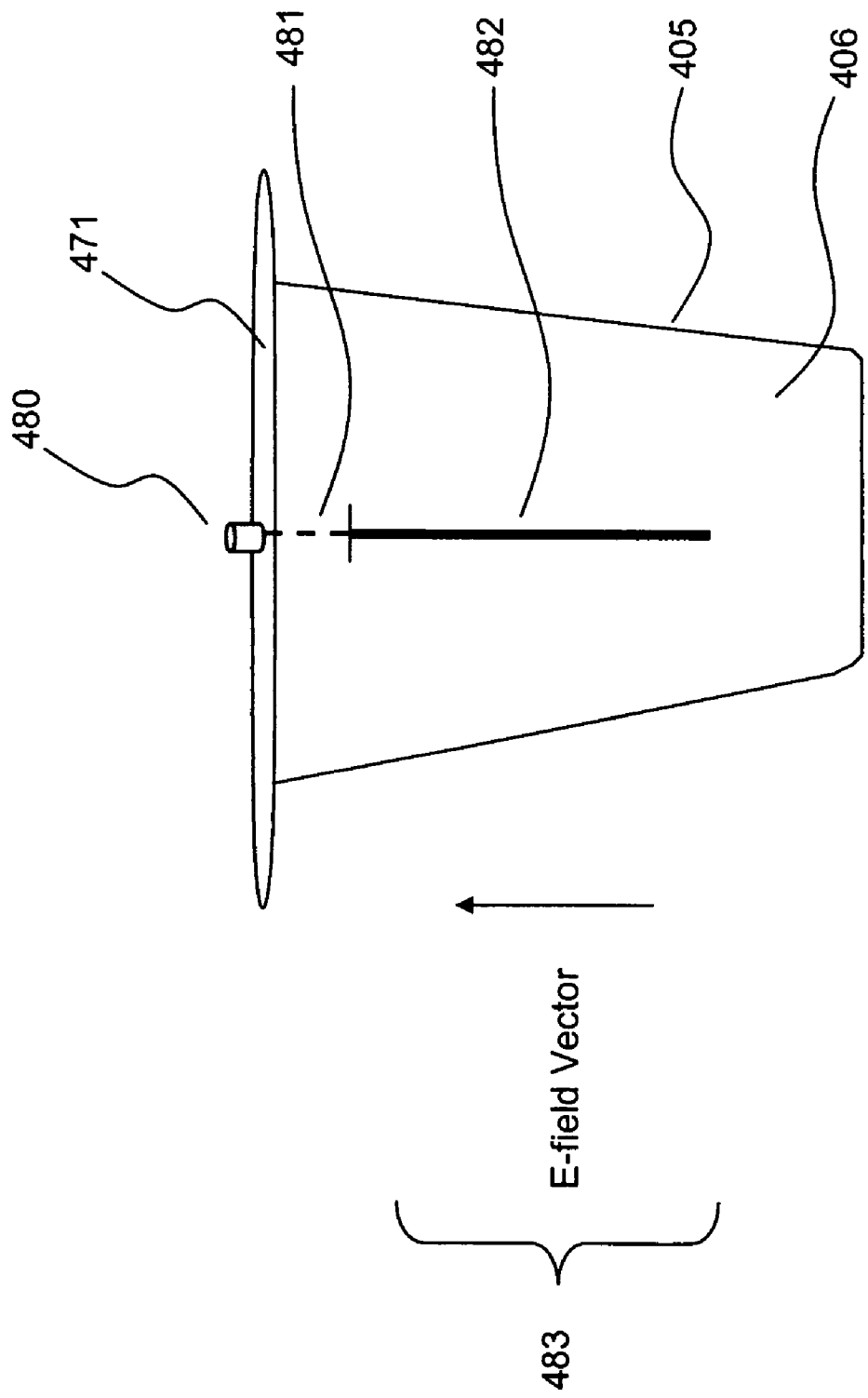
FIG. 4C illustrates a belly mounted blade antenna with a monopole antenna radiator that has an E-field vector parallel to the long axis of the monopole element.
Figure 4D:
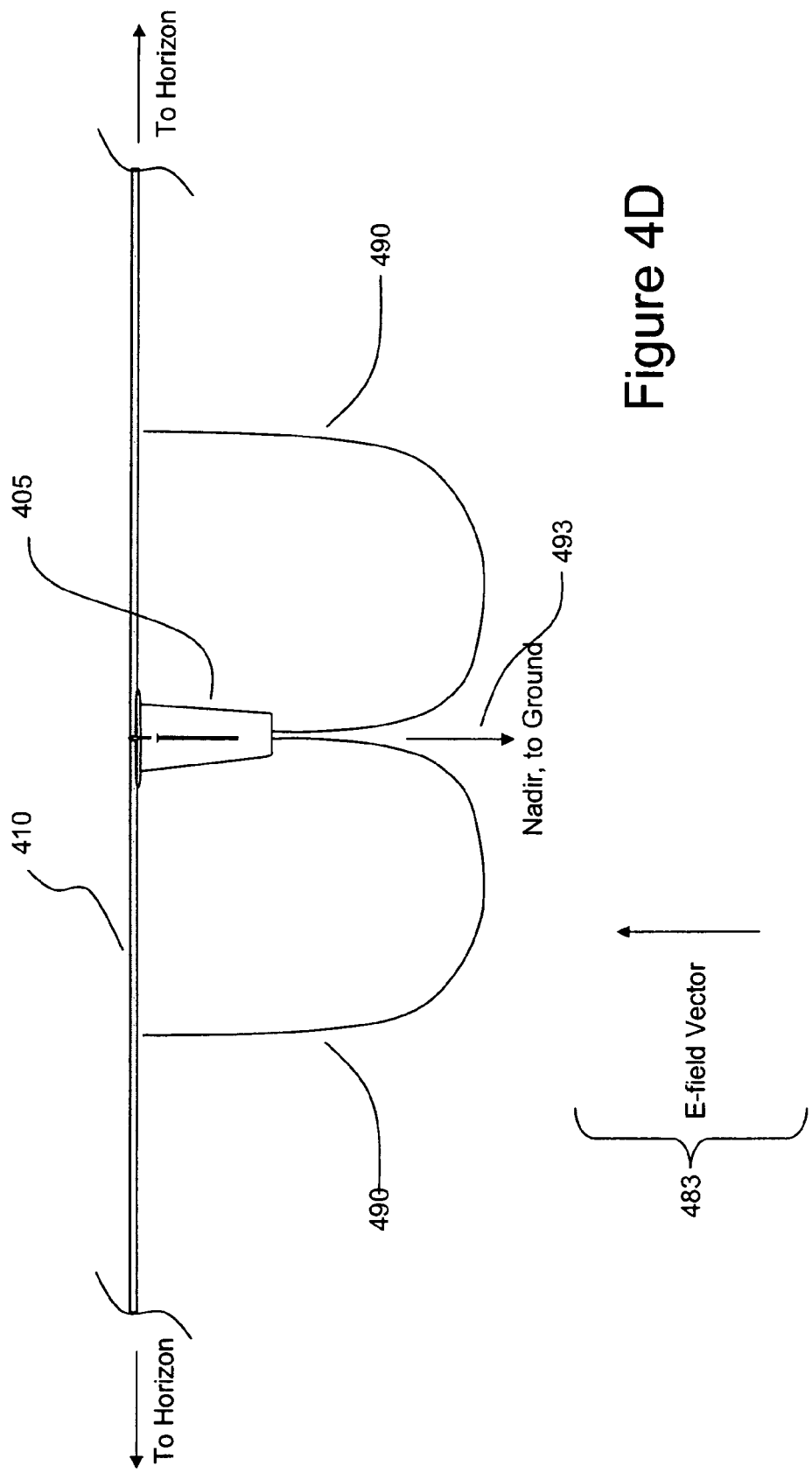
FIG. 4D illustrates the Radio Frequency radiation pattern for the belly mounted blade antenna of FIG. 4C, with a vertical E-field and radiated far field pattern over a conductive surface.

FIG. 4C illustrates a belly mounted blade antenna 405 with vertical monopole over a conductive surface 410. The RF in/out connector is 480 and the base mounting flange is 471, which is attached to the belly of the aircraft. Coaxial cable 481 feeds the monopole radiator 482. The blade housing 406 is made of a flight worthy material such as fiberglass and is RF transparent. The E-field for this antenna is vertical as shown in 483. In straight and level fight, 483 is perpendicular to the aircraft belly and also perpendicular to the Earth. This antenna 405 generates an electromagnetic far field 490 and, like the horizontally polarized slot, has a nadir directed pattern null 493. Unlike the horizontally polarized slot mounted on the aircraft belly, the vertically polarized monopole does not have a pattern null in the horizon direction. The far field pattern is radially symmetric around nadir vector 493. In summary, FIG. 4D illustrates the Radio Frequency radiation pattern for the belly mounted blade antenna 405 of FIG. 4C, with a vertical E-field 483 and radiated far field pattern 490 over a conductive surface 410.

For either of these example antennas, that is the horizontally polarized slot (FIGS. 4A and 4B) or the vertically polarized monopole (FIGS. 4C and 4D), the far field patterns will change significantly if these antennas are mounted on a composite or non-conductive airframe. For a non-conductive airframe, other antenna types may be more suitable, or a conductive material can be imbedded in the fuselage belly region where the antenna is mounted. For example, the horizontally polarized slot antenna will actually perform better over a non-conductive airframe since the E-field isn't shorted out at horizon. In any event, this is a separate high frequency electromagnetics design problem that has been identified herein and the concept of inverse multiplexing using multiple links is still possible on non-metallic aircraft or composite airframe aircraft.

Figure 5A:
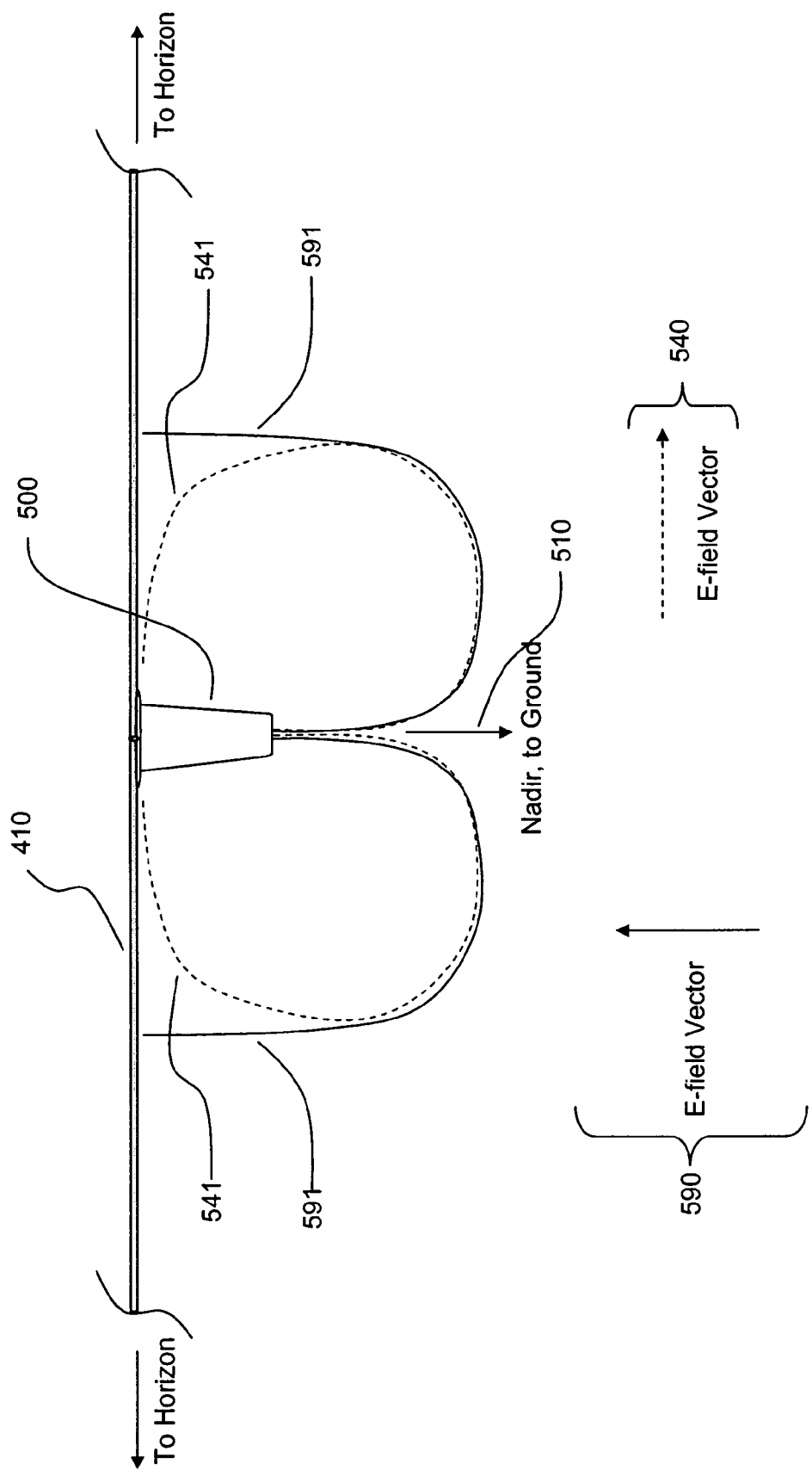
FIG. 5A illustrates a belly mounted blade antenna with both vertical and horizontal E-fields.

FIG. 5A illustrates a belly mounted blade antenna 500 with both vertical and horizontal E-fields. This antenna 500 generates two electromagnetic fields: the first far field pattern 591 with a vertical polarization E-field 590, and the second far field pattern 541 with a horizontal E-field polarization 540. This antenna is conceptually mounted on the belly of a conductive 410 aircraft fuselage. Antenna 500 is called a "dual linear polarization antenna". It retains a nadir 510 directed null, and the far field patterns of both polarizations are radially symmetric around vector 510. The horizontal pattern 541 retains its horizon roll-off when it radiates over an electrically large conductive surface.

Figure 5B:
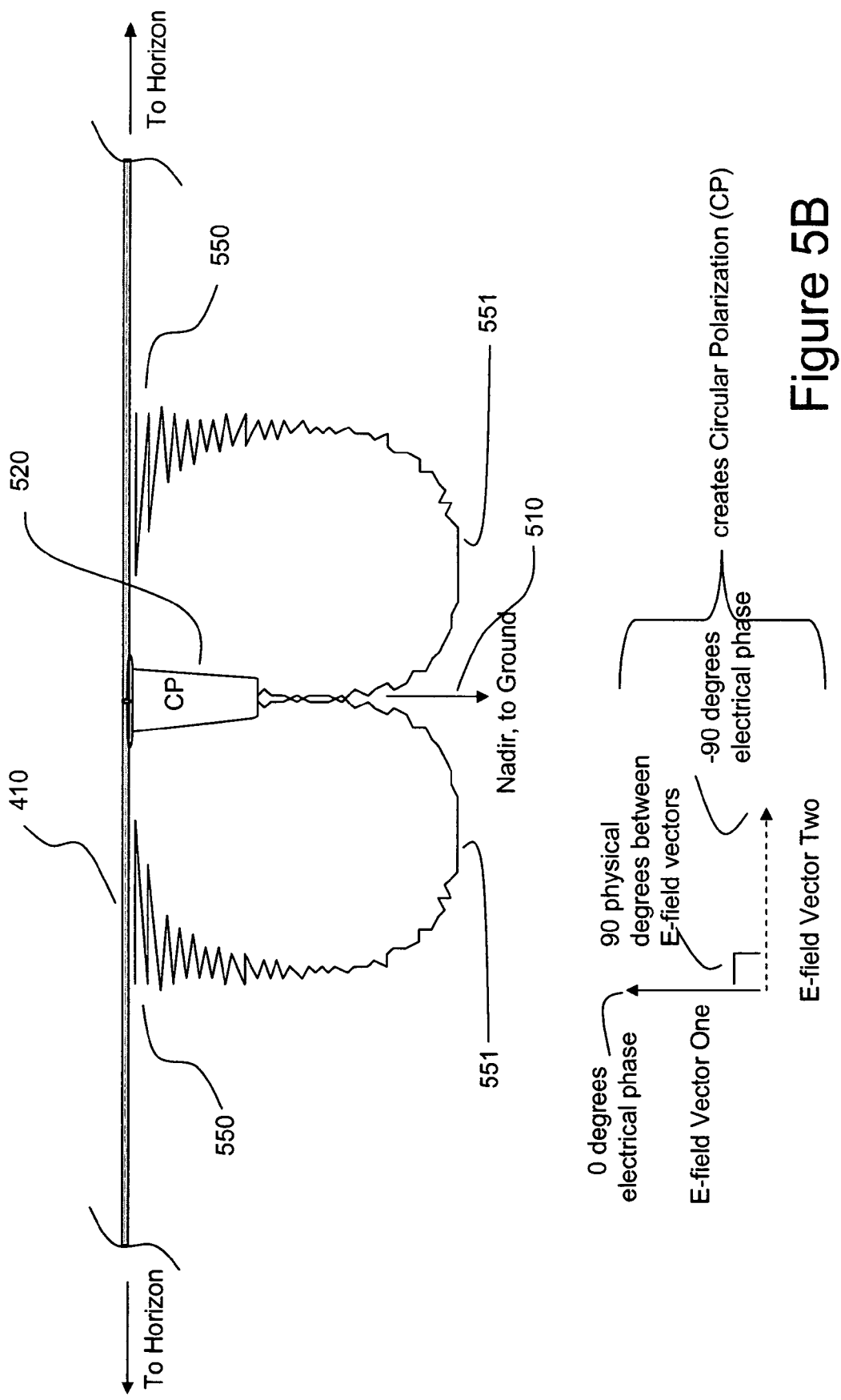
FIG. 5B illustrates a circularly polarized belly mounted antenna with a far field radiated pattern over a conductive surface (the axial ratio of this antenna becomes poor at horizon; however, unlike FIG. 4B, the radiated power only drops −3 dB versus being a perfect theoretical null as in FIG. 4B)

FIG. 5B illustrates a circularly polarized belly mounted antenna 520 with an associated far field radiated pattern over a conductive surface (aircraft belly) 410. This antenna 520 could be a combination of antennas in FIGS. 4A and 4C, or it could be an entirely different antenna structure such as a "normal mode" helix which radiates circular polarization perpendicular to its long nadir directed axis (or along the horizon) and has a similar nadir directed null The key difference between FIGS. 5A and 5B is that, in FIG. 5B, the two dual linear orthogonal polarizations are now electrically phased 90 degrees apart (as shown on FIG. 5B). The resulting polarizations are now Right Hand Circular Polarization (RHCP) and Left Hand Circular Polarization (LHCP). To create both RHCP and LHCP, one is fed +90 degrees between V-pol and H-pol, and the other is fed −90 degrees between V-pol and H-pol. The combination of the original two far field patterns electrically phased 90 degrees apart creates a combinatorial pattern effect called "the axial ratio" shown at 551 and at 550. At 551, the axial ratio is small, indicating a high degree of circular polarization purity. This is because the original V-pol and H-pol far field pattern magnitudes in this region are nearly equal in magnitude. However, in the 550 region, the axial ratio is poor because the H-pol magnitude in this region goes to zero (or has a pattern null. Like the dual linear antenna, the circularly polarized antenna is radially symmetric around nadir vector 510.

The critical importance of using circular polarization is that in the region of 550, while the axial ratio is poor because the V-pol contributor in this region does not have a pattern null, the net effect is only a −3 dB loss (versus a complete loss if strictly H-pol over a conductive surface is deployed). Again, the concept of inverse multiplex, multiple links relies on high quality, high availability far field aircraft antenna patterns; this is particularly true in the horizon region which has the largest volume of three-dimensional space to provide service to, but is also the region that has the greatest propagation distances. Therefore, methods such as using circular polarization to improve the aircraft antenna far field patterns on/off of the aircraft in this critical horizon region of space are essential elements to an aggregate systems design for inverse multiplex.

Figure 6:
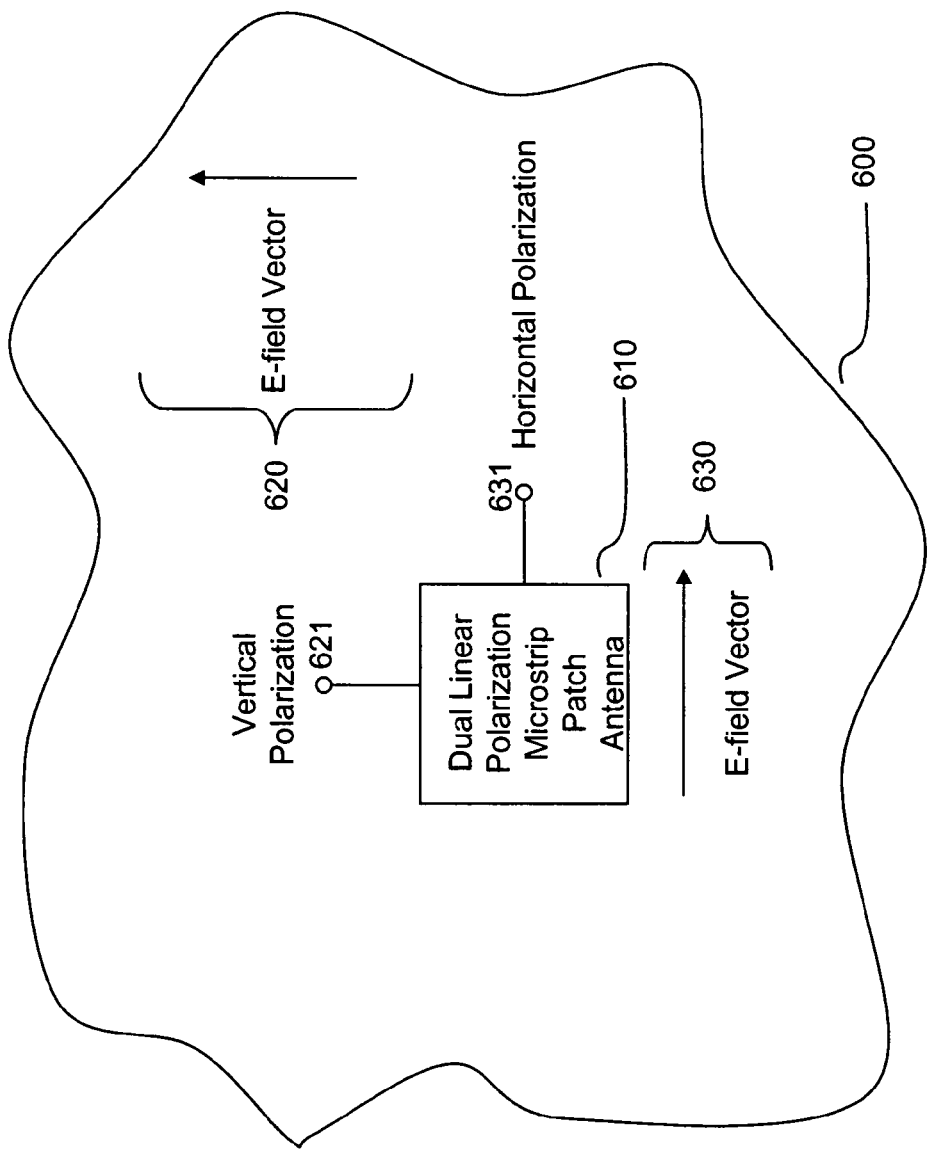
FIG. 6 illustrates the Radio Frequency signal outputs of a typical dual linear polarization micro-strip patch antenna mounted on a conductive surface in the plane of the radiating antenna.
Figure 7:
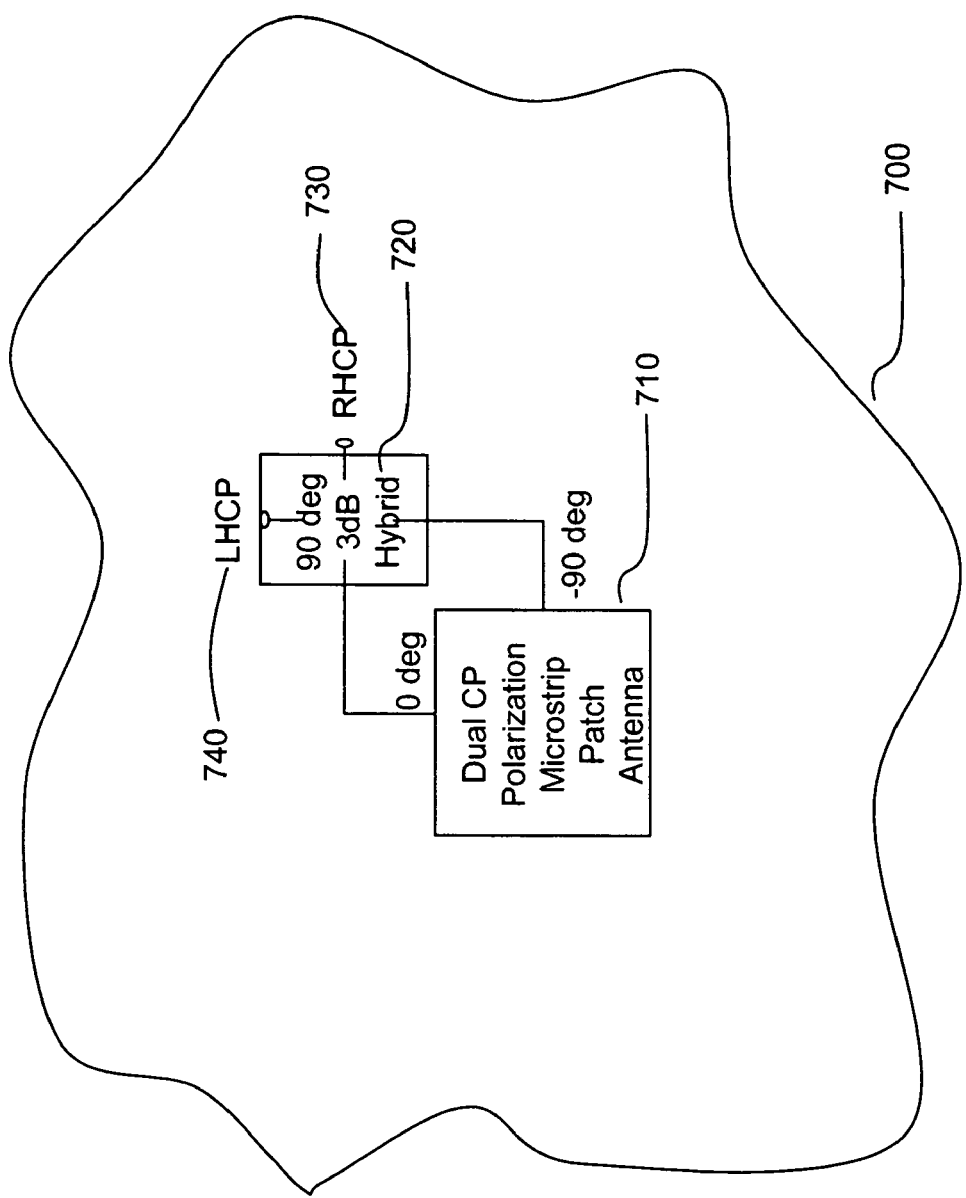
FIG. 7 illustrates the Radio Frequency signal outputs of a typical dual circular polarization micro-strip patch antenna mounted on a conductive surface in the plane of the radiating antenna.

FIG. 6 illustrates the Radio Frequency signal outputs of a typical dual linear polarization micro-strip patch antenna 600, where one output at terminal 621 is vertically polarized, generating a vertical E-field vector 620, while the output at terminal 631 is horizontally polarized, generating a horizontal E-field vector 630. Similarly, FIG. 7 illustrates the Radio Frequency signal outputs of a typical dual circular polarization micro-strip patch antenna 710, where one output is polarized at 0° and the other output is polarized at −90° for one polarization, and then the other polarization is 0° and +90 degrees (not shown on FIG. 7). These two signals are simultaneously applied to 90 degree hybrid 720 which generates a right hand circularly polarized E-field vector 730 and a left hand circularly polarized E-field vector 740. Note that conductive surface 700 will affect far field pattern shapes in the plane of the conductor since the E-field necessarily goes to zero.

One key advantage of using micro-strip patch antennas is that they can be easily arrayed to create beam and pattern shaping on/off the aircraft. This feature allows the systems designer to develop intra-aircraft antenna pattern isolation, thereby offering another design degree of freedom. More importantly, it allows for much higher gain aircraft antennas. For instance, the horizontally polarized slot in FIGS. 4A and 4B and the vertically polarized monopole in FIGS. 4C and 4D have antenna gains that are relatively low, in practice around 0 dBi (relative to an isotropic radiator) but more often are −2 dBi to −4 dBi due to airframe effects. In contrast, a single micro-strip patch antenna has peak gains of around +5 dBi and an array of patch antennas will have significantly higher gains. This not only improves the link budget equations to/from the aircraft but also offers intra-aircraft, multiple antenna isolation. Also, it improves directionality to a given terrestrial base station sector. Micro-strip patch arrays can be made conformal, that is conforming to the shape of the aircraft fuselage where the antenna is mounted. This enables a very smooth air stream flow over the antenna, reduces overall drag, and improves aircraft fuel efficiency.

Micro-Strip Aircraft Antennas

Figure 8A:
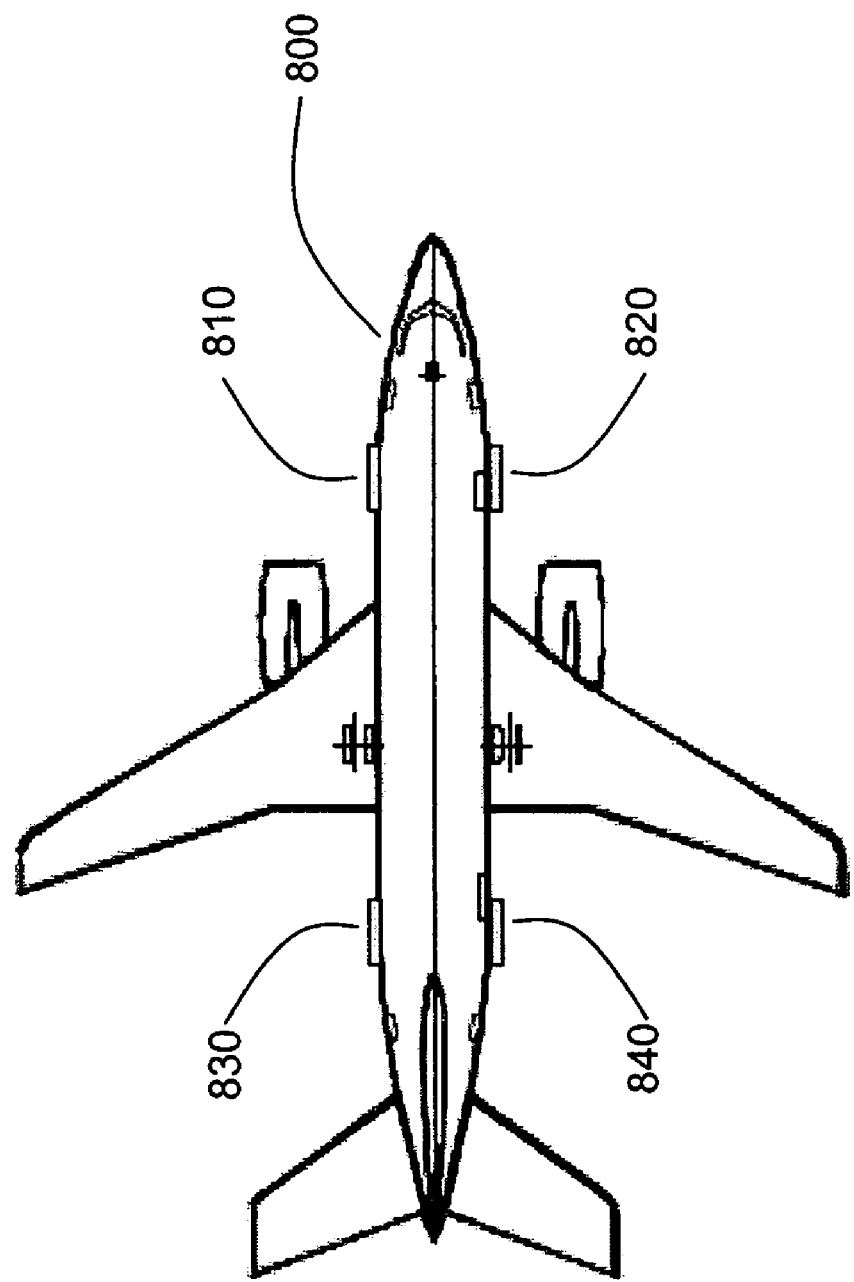
FIG. 8A illustrates conformal micro-strip patch antennas (or arrays), which are linearly or circularly polarized, mounted on the side fuselage of an aircraft (or in the region between the belly and the side fuselage) (these micro-strip antennas could be single radiators as shown in FIGS. 6 and 7, or configured as an array of micro strip radiators)

FIG. 8A illustrates a set of conformal micro-strip patch antennas 810 through 840 (or arrays) mounted on the side fuselage of aircraft 800, which conformal micro-strip patch antennas 810 through 840 are circularly polarized (but could also be linearly polarized). The mounting locations could be on the side of the fuselage or they could be in the transition region between the belly and the side.

FIG. 8B illustrates an alternative configuration where conformal micro-strip patch antennas (or arrays) 870 are mounted on the belly of the aircraft 850, which nadir (ground) pointing antennas 870 are circularly polarized. The Air-To-Ground cellular communications network includes a base station 880 which is equipped with a zenith directed circularly polarized antenna. The Air-To-Ground Radio Frequency communications link 890 includes uplink and downlink components which are co-polarized independent of the flight yaw angle. The importance of this configuration is to provide spatial coverage in the "donut hole" region above terrestrial cell sites and the "donut hole" region (below aircraft) of typical aircraft antennas which have a nadir directed null. The terrestrial antenna pointed at zenith (or straight up) could be a micro-strip patch antenna or it could be an axial mode helix which radiates end-fire. The antennas, both ground and air, can be single circular or dual circular polarized (which increases capacity). Since both the aircraft and the terrestrial antennas are circularly polarized, the aircraft can fly at any compass heading (yaw) over a cell site and always be co-polarized.

Figure 9A:
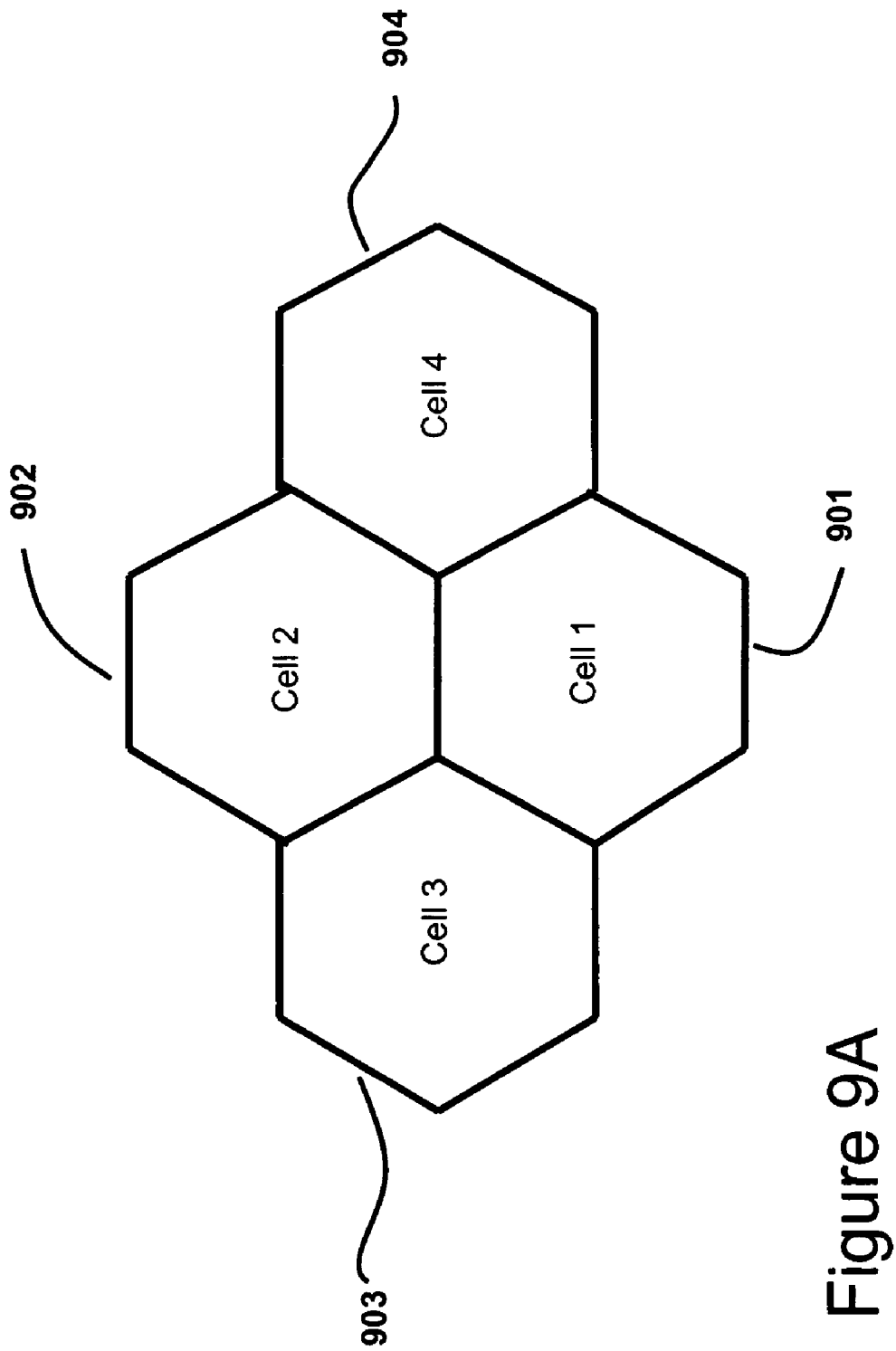
FIG. 9A illustrates the typical pattern of cell sites in the Air-To-Ground cellular communications network formed by a number of Air-To-Ground terrestrial base stations (the use of a hexagonal cell shape allows for easy description)

Summary—Line-of-Sight Shadowing And Horizontal Polarization Pattern Nulling Along Conductive Surfaces The use of multiple antennas on the aircraft addresses the Line-Of-Sight issue and, as discussed above, there are a number of types of antennas that can be used, as well as a number of antenna configurations. In addition, there are aircraft based antenna solutions to correct or compensate for horizontal polarization pattern nulling, particularly along the long axis of the fuselage. The proper antenna positioning and the selection of the polarization of the Radio Frequency signals provides a significant improvement in the traffic (data and voice) handling capacity of the Air-To-Ground Radio Frequency communications link Intra-System Co-Channel Interference A typical Air-To-Ground cellular communications network consists of a number of terrestrial (ground) base stations, each of which provides a radio frequency coverage area in a predetermined volume of space, radially arranged around the cell site transmitting antenna. FIG. 9A illustrates the typical pattern of cell sites 901-904 in the Air-To-Ground cellular communications network formed by a number of terrestrial base stations. The use of a hexagonal shape is representative, but the real-world shape is generally more circular and multi-dimensional, having azimuth and elevation aspects. Each terrestrial base station uses an antenna pattern which is insensitive to the reception of ground-originating or ground-reflected signals and which antenna pattern is transmissive or receptive only in a skyward direction. Terrestrial base stations can also be co-located near airports to enable network coverage when aircraft are on the ground; in this case, the antenna patterns are optimized for terrestrially located aircraft. The Air-To-Ground terrestrial base stations are geographically distributed, generally following a typical cellular communications network layout. The boundaries of the coverage area of each Air-To-Ground terrestrial base station are substantially contiguous with that of neighboring sites so that the composite coverage of all of the terrestrial base stations in the Air-To-Ground cellular communications network generally provides complete coverage over the targeted area.

Sectoring of the Coverage Area

Figure 9B:
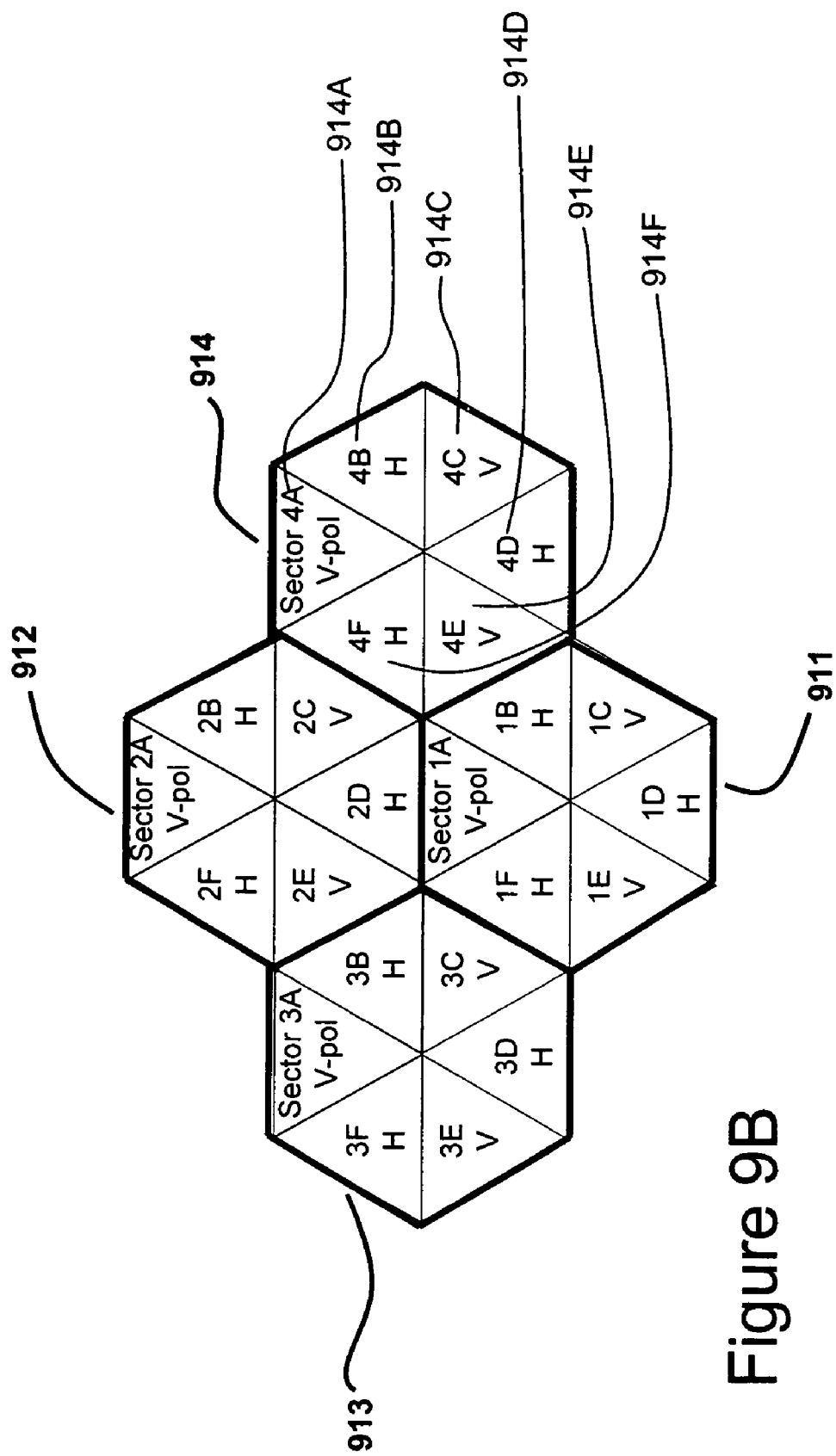
FIG. 9B illustrates the azimuthal sectoring of an Air-To-Ground terrestrial base station antenna's far field pattern into six sectors using vertical and horizontal polarization to discriminate between sectors (the sectors are further partitioned in the polarization domain; in this example, vertical and horizontal polarization alternate between adjacent sectors)
Figure 9C:
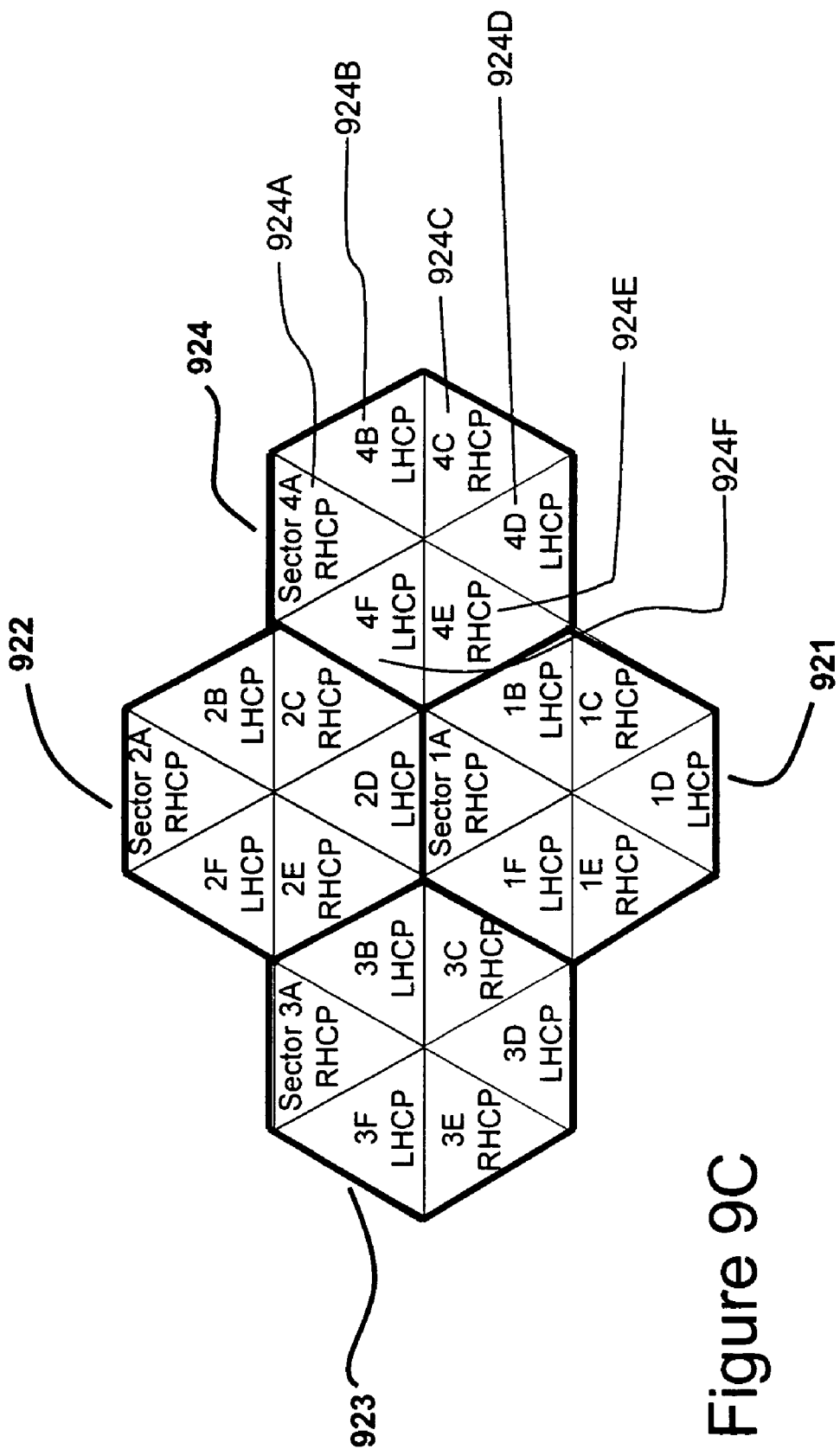
FIG. 9C illustrates the elevation sectoring of an Air-To-Ground terrestrial base stations antenna's far field pattern into six sectors using right hand and left hand circular polarization to discriminate between sectors (the sectors are further partitioned in the polarization domain; in this example, Right Hand Circular Polarization (RHCP) and Left Hand Circular Polarization (LHCP) alternate between adjacent sectors)

CDMA systems are inherently interference limited. One solution to minimize intra-system co-channel interference is to use one or more dual-polarized antennas on the aircraft together with like dual-polarized antennas on the terrestrial base stations. More specifically, in a CDMA system, each individual terrestrial cell sector will be like-polarized for both transmit and receive, for example, both are V-pol; and the adjacent sector would be also be like-polarized for transmit and receive; however, it would be substantially orthogonal in its polarization, i.e., H-pol, to the previous adjacent sector (which was V-pol). FIG. 9B shows an example of azimuthal sectoring of an Air-To-Ground terrestrial base stations antenna's far field pattern into six-sectored (A-F) cell sites 911-914 with the implementation of vertical and horizontal polarization on alternating sectors. The use of alternating polarization is beneficial to the Air-To-Ground Line-Of-Sight environment because the polarization of the Radio Frequency signal is not lost due to multi-path propagation as it is in terrestrial systems. As an example, cell site 914 is divided into six sectors 4A-4F (914A-914F), which alternate between two substantially orthogonal polarizations. Thus, as an example, sectors 914A, 914C, 914E are vertically polarized, and sectors 914B, 914D, 914F are horizontally polarized. Note that this polarization isolation also exists at the boundary of cell 912 and 914 where 914F is horizontally polarized and 912's "2C" sector is vertically polarized FIG. 9C illustrates the azimuth sectoring of an Air-To-Ground terrestrial base stations antenna's far field pattern into six-sectored (A-F) cell sites 921-924 with the implementation of RHCP and LHCP polarization on alternating sectors. The use of alternating polarization is beneficial to the Air-To-Ground Line-Of-Sight environment because the polarization of the Radio Frequency signal is not lost due to multi-path propagation as it is in terrestrial systems. As an example, cell site 924 is divided into six sectors 4A-4F (924A-924F), which alternate between two substantially orthogonal polarizations. Thus, as an example, sectors 924A, 924C, 924E are right hand circularly polarized, and sectors 924B, 924D, 924F are left hand circularly polarized In these examples, the antenna patterns for both FIGS. 9B and 9C each have approximately 60 degrees of azimuth coverage per sector. The elevation patterns of these given sectors can vary from including all of the elevation space from horizon to zenith (i.e., 90 degrees of coverage) or the elevation space could also be sectored (on a per azimuth sector basis).

Figure 9D:
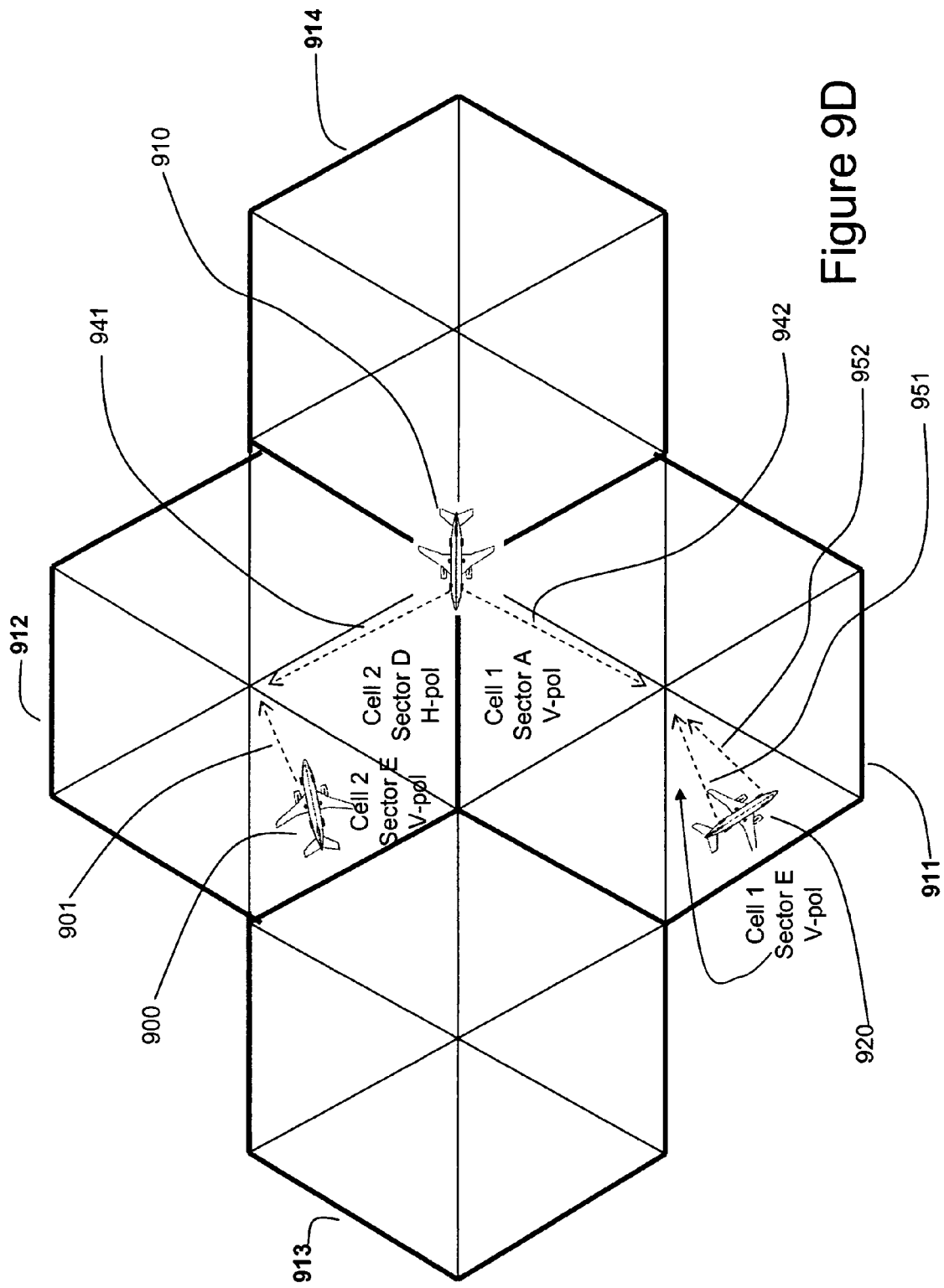
FIG. 9D illustrates three aircraft extant in the system illustrated in FIG. 9B, where the azimuthal sectoring of an Air-To-Ground terrestrial base station antenna's far field pattern into six sectors using vertical and horizontal polarization is used to discriminate between sectors and where the aircraft can simultaneously communicate with more than one sector if the spatial geometry permits.

FIG. 9D illustrates three aircraft extant in the system illustrated in FIG. 9B where the azimuthal sectoring of an Air-To-Ground terrestrial base station antenna's far field pattern into six sectors using vertical and horizontal polarization is used to discriminate between sectors. Aircraft 900 is served by Air-To-Ground communications link 901 of cell 912 in sector 2E, which uses vertical polarization. Aircraft 910 is at the boundaries of cells 911, 912, 914 and is served by Air-To-Ground communications links 941, 942 of cells 912, 911 in sectors 2D, 1A, respectively, which uses horizontal polarization, vertical polarization of the Radio Frequency signals, respectively. Finally, Aircraft 920 is served by an Air-To-Ground communications link 951, 952 of cell 911 in sector 1E, which uses vertical polarization of the Radio Frequency signals. In this case, the CDMA EVDO receiver is using spatial diversity receive, since both aircraft antennas are vertically polarized and there is a corresponding "diversity receive gain" at the aircraft.

Reflective Path Interference

Figure 10A:
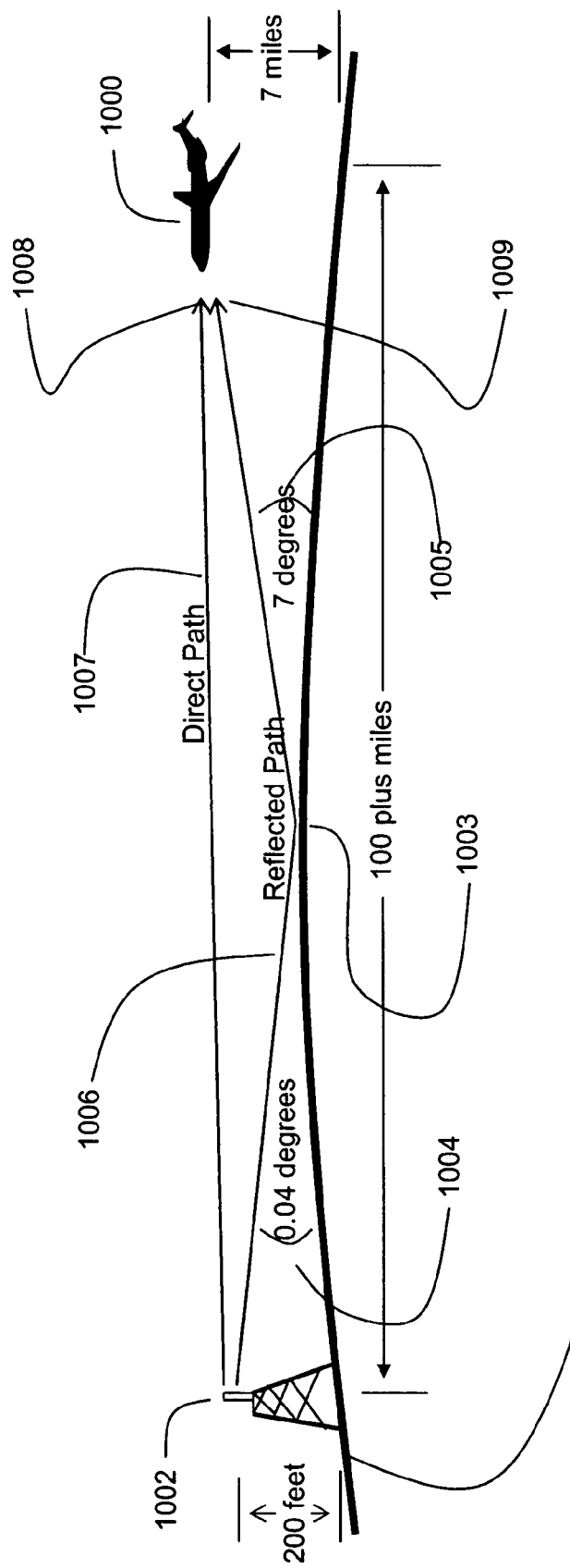
FIG. 10A illustrates the direct and reflected paths of a Radio Frequency signal in the case where the aircraft is distant from the base station antenna and has a very shallow propagation look-angle.

FIG. 10A illustrates the direct 1007 and reflected 1006 paths of a Radio Frequency signal in the case where the aircraft 1000 is distant from the base station antenna 1002 and at a shallow propagation angle. In particular, this example illustrates the relationship between the direct 1007 and reflected 1006 paths of a Radio Frequency signal in a typical situation, where the base station antenna 1002 is approximately 200 feet high and the aircraft 1000 is flying at an altitude of 7 miles. The distance between the base station antenna 1002 and the aircraft 1000 is shown as 100 miles. At this distance and flight altitude, the angle 1004 between the reflected path 1006 and the surface of the Earth is 0.04 degrees, with the reflected path encountering the surface of the Earth at point 1003. On the outgoing segment of this path, angle 1005 between the reflected path 1006 and the surface of the Earth is 7 degrees. For this example, these calculated angles generally assume a flat earth vs. a 4/3 radio profile earth.

Since the propagation angles noted above are extremely shallow, the Direct Path 1007 and the Reflected Path 1006 distances are virtually equal; hence, there is equal propagation delay and equal arrival phase for both signals 1008, 1009. Furthermore, the Reflected Path base station ray 1009 has a magnitude equal to the Direct Path base station ray 1008, but with a 180 degree phase change relative to the Direct Path (from the reflection point 1003). Thus, when the aircraft 1000 is at the horizon, there is a deep pattern null in the Radio Frequency signals at the aircraft 1000 since the Direct Ray 1008 (Direct Path 1007) and the Reflected Ray 1009 (Reflected Path 1006) are equal magnitude but opposite phase. Shaping the base station antenna pattern at horizon by rolling it off around −5 dB (in the horizon direction) generally corrects this propagation issue at horizon. The reverse propagation path from the aircraft to the base station is not always reciprocal, since the grazing reflection angle is generally a larger angle (above a few degrees grazing angle and the pattern nulling problem is not as pronounced).

Figure 10B:
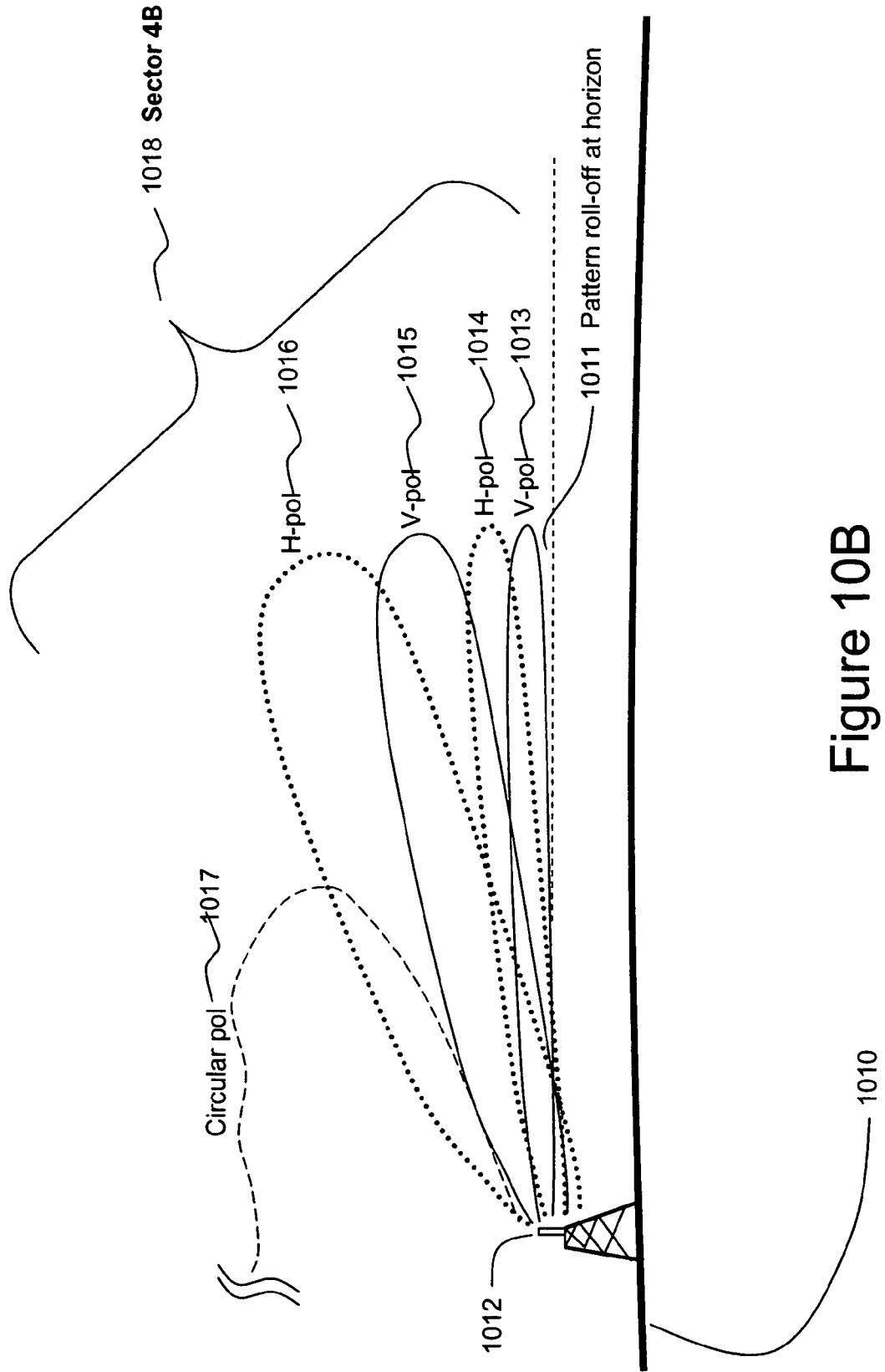
FIG. 10B illustrates a cell site divided into multiple sectors in an elevation direction, where elevation sectors alternate between two substantially orthogonal polarizations.

FIG. 10B illustrates a cell site divided into multiple sectors 1013-1016 in an elevation direction, which alternate between two substantially orthogonal polarizations. These elevation patterns could be radially symmetric around the terrestrial base station 1012 if the cell were omni-directional, or these patterns could be just for a given azimuthal sector (such as shown in the FIG. 9 series which have 6 sector azimuth cells). The polarizations shown are an example and nothing limits polarization selection, be it linear or circular. Each pattern has a different gain, pointing angle above horizon, and different beam width to balance the link budget versus distance versus the volume of space covered (i.e., how much capacity that volume of space requires). In general, it is anticipated that as the elevation angle increases, that particular antenna's vertical beam width is greater than the beam width of the antenna pattern below it. Pattern 1017 is circular polarization so that it is always co-polarized independent of the direction a given aircraft flies over the cell 1012. The region of space 1011 illustrates pattern roll-off at horizon to minimize the impact of nulling as described in FIG. 10A.

Figure 10C:
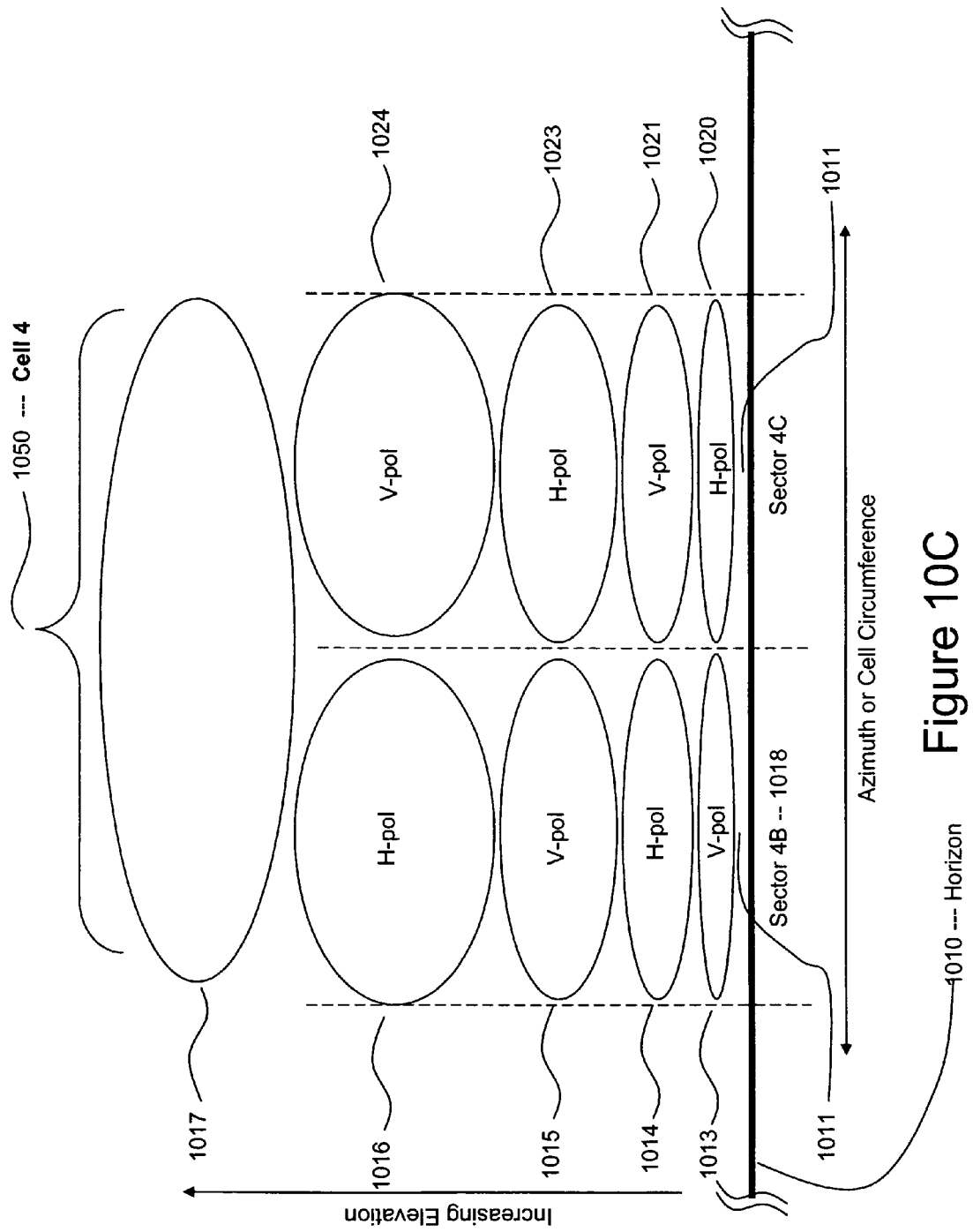
FIG. 10C illustrates a cell site that is divided into two shown azimuth sectors further divided into multiple sectors in elevation, which both sectorization dimensions alternate between two substantially orthogonal polarizations so that in the spatial domain no two sectors, whether in azimuth or in elevation or both dimensions, have the same adjacent sector polarization as that being used in the current sector.

FIG. 10C illustrates a cell site 1050 (Cell 4) divided into multiple sectors 1013-1016 in elevation (as shown in FIG. 10B), 1020-1024 in elevation, which alternate between two substantially orthogonal polarizations. Elevation sectors 1013-1016 are in azimuth sector 4B (1018) and elevation sectors 1020-1024 are in azimuth sector 4C The zenith looking antenna 1017 is circularly polarized Antenna patterns 1013 and 1020 are generally pointed at horizon although they have mechanical or electrical uptilt to remove energy directly at horizon (1011). It is clear that it is possible to combine both azimuth and elevation sectoring and still realize polarization isolation between each sub-antenna-beam. For example, antenna pattern 1023 is isolated in both azimuth and elevation: 1023 is H-pol and 1015 is V-pol (in azimuth); in elevation, 1024 is V-pol and 1021 is V-pol; but 1023 in the middle is H-pol. The region of space 1011 illustrates pattern roll-off at horizon to minimize the impact of nulling as described in FIG. 10A.

Thus, the above examples of sectoring illustrate some of the ways to populate the non-terrestrial region of space with a plurality of multi-dimensional Radio Frequency sectors which are multi-polarization to exchange call traffic between a plurality of wireless subscriber devices located in an aircraft and the Air-To-Ground cellular communications network The sectors are created in the multi-dimensional space—in azimuth, in elevation, in altitude, or in multiple planes—which controllably parses the non-terrestrial space to match the communication needs of the aircraft operating in this space. With the addition of polarization of the Radio Frequency signals to reduce the interference between adjacent sectors, the present Multi-Link Aircraft Cellular System creates a multi-dimensional array of Radio Frequency "tunnels", each of which supports an associated Air-To-Ground cellular communications link with one or more aircraft. The availability of multiple Radio Frequency "tunnels" enables the Air-To-Ground cellular communications network to precisely manage the effective Radio Frequency signal bandwidth that is made available to each aircraft by assigning tunnels as needed to a particular aircraft. The tunnel can have attributes in Time, Space, Code, Polarization, Antenna-Aircraft, Antenna-Ground, Frequency, Azimuth Sectoring, Elevation Sectoring, Pitch, Roll, Yaw, Flight Speed, and other. The description of the management of this communication space is presented below and represents a powerful tool to solve the Air-To-Ground cellular communications network call handling capacity problem and dramatically improves system availability, system reliability, and system capacity.

Multiple Air-to-Ground Links

FIG. 11A illustrates an example where conformal microstrip patch antennas (or arrays) 1120 are mounted on the belly of the aircraft 1110, which nadir (ground) pointing antennas 1120 are circularly polarized The Air-To-Ground cellular communications network includes an Air-To-Ground terrestrial base station 1105 which is equipped with a zenith directed circularly polarized antenna. The Air-To-Ground Radio Frequency communications link 1130 includes uplink and downlink components which are co-polarized independent of the flight yaw angle; in this example, the polarization is RHCP. In addition, the aircraft 1110 is equipped with a belly mounted vertically polarized blade antenna 1130, which is shown communicating via Air-To-Ground Radio Frequency communications link 1140 with Air-To-Ground terrestrial base station 1107, which is equipped with an azimuth sectored vertically polarized antenna.

The two Air-To-Ground cell sites 1105, 1107 are served by an associated Base Transceiver Station (BTS) 1135, 1145, respectively, which are connected via an IP or proprietary network 1150 to the Base Station Controller (BSC) 1151, as is well known in the cellular communications art. The BSC then connects to the PSTN, PSDN and Internet (1152). All communication pathways from the PSTN-PSDN-IP (1152) to the aircraft (1110) are bi-directional.

Air interface path 1140 and air interface path 1130 could each be carrying traffic (data and voice) to/from the aircraft as single stand-alone paths; that is, path 1130 does not contain any information that is inter-mixed with path 1140. An example might be that path 1130 is for business and first class customers only and path 1140 is for economy or coach passengers only. In this case, there is no logical or physical connection between links 1130 and 1140.

Alternatively, paths 1130 and 1140 could be logically connected and operate in an inverse multiplex, multi-link fashion where part of the aggregate traffic (data and voice) from the aircraft is carried partially by 1130 and the remaining traffic not carried by 1130 is carried by 1140. With a multi-link approach, the individual data packets are no longer time synchronous, i.e., packet 2 follows packet 1. Therefore, an inverse multiplex functionality needs to reside both at the aircraft and also on the ground to "re-assemble" the information conveyed by paths 1130 and 1140 in the correct order (with no missing packets) into an aggregate, composite data stream.

FIG. 11B illustrates a generalized view of the Air-To-Ground cellular communications network serving multiple aircraft, each of which is connected via at least one Air-To-Ground Radio Frequency communications link The aircraft 1110, 1170-1173, each have at least one Air-To-Ground Radio Frequency communications link 1130, 1140, 1160-1164 that connects the aircraft with at least one serving Air-To-Ground terrestrial Base Transceiver Station (BTS) 1135, 1145, 1190, and 1191. Data communication links 1180-1183 interconnect the Air-To-Ground terrestrial Base Transceiver Stations (BTS) 1135, 1145, 1190, 1191 via a communications network 1150 and data communication links 1184-1185 with associated Base Station Controllers 1151, 1195, which are, in turn, interconnected with common carrier networks 1152.

Thus, the basic architecture of this Air-To-Ground cellular communications network is analogous with that of a terrestrial cellular communications network, with the additional complexity of the aircraft and the use of multiple Air-To-Ground Radio Frequency communications links per aircraft to distribute the traffic generated by the wireless terminal devices located on each aircraft throughout the Air-To-Ground cellular communications network Inverse multiplexing capability resides both on the aircraft 1110 and 1170-1173 as well on the ground either in network 1150, in the BSC 1184-1185, or in another new network device created specifically for this purpose (inverse multiplexing). The concept of inverse multiplexing involves the sharing of multiple links to convey data traffic. In FIG. 11B, aircraft 1110 is simultaneously communicating with 1135 (BTS-1) and 1145 (BTS-2). Note that the far left side of FIG. 11B is a replication of the more physical illustration FIG. 11A. For example, path 1130 is circularly polarized in both FIGS. 11A and 11B, and path 1140 is vertically polarized in both FIGS. 11A and 11B. For both FIGS. 11A and 11B, the BTS's are 1135 and 1145. For both FIGS. 11A and 11B, the interconnection network between BTS and BSC is 1150, the BSC is 1151, and the public network is 1152.

Figure 12A:
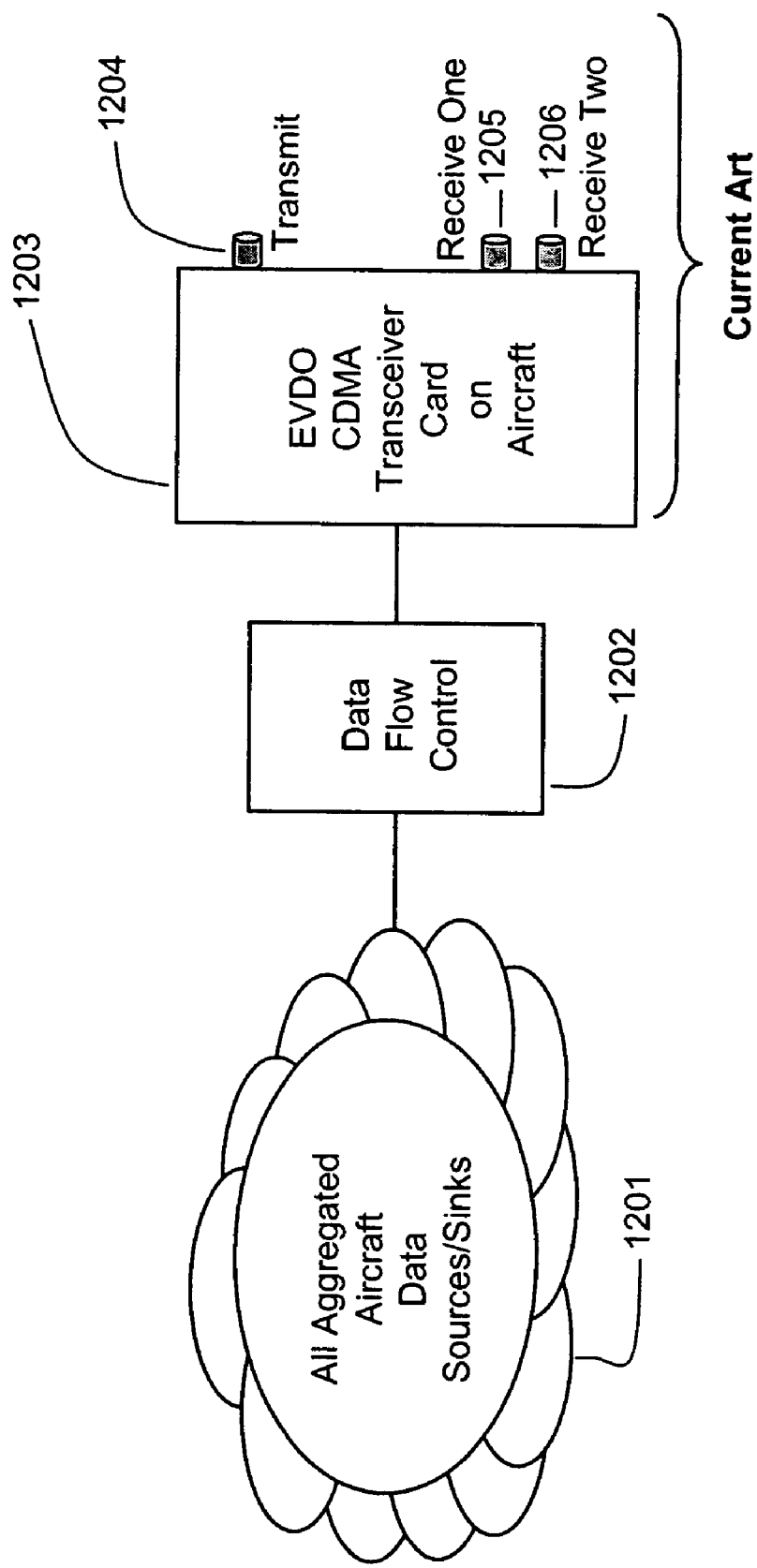
FIG. 12A illustrates, in block diagram form, the interconnection of the aircraft data and voice traffic via data flow control to a current technology transmit-receive module (transceiver) with one transmit port and two receive ports.

FIG. 12A illustrates, in block diagram form, the interconnection of transmit and receive signals to the dual antennas on the aircraft. The air-craft contains a plurality of customer terminal devices, each of which has data communication needs. The interconnection of these term devices is effected by a wireless Local Area Network of other means to aggregate the data sources 1201 and use a data flow control process 1202 to interconnect the customer terminal devices with the Air-To-Ground cellular communications network via the transceiver card 1203 which supports a transmit port 1204 and two receiver ports 1205, 1206. The transmit path is selected based on the best receive path pilot measurement. Transmit diversity is not presently possible. The receiver has diversity receive capability through time correlation of two signals which are multi-path delayed but arrive from the same source or sector.

Figure 12B:
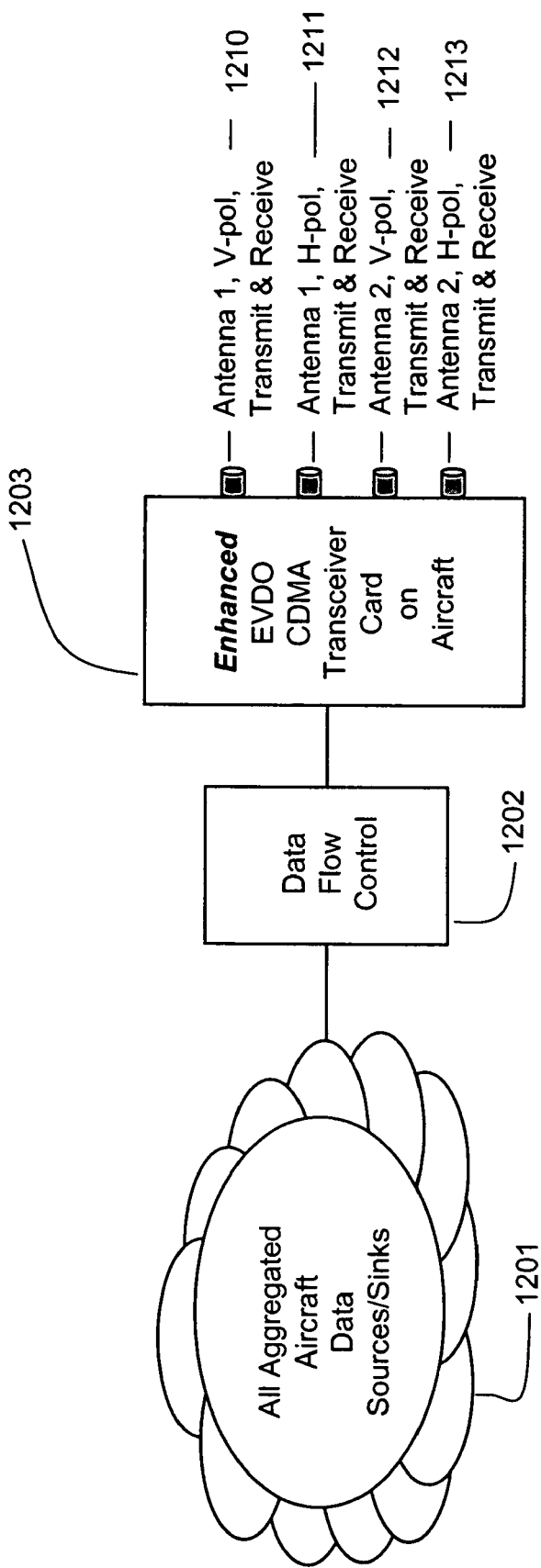
FIG. 12B illustrates, in block diagram form, an enhanced transceiver module with four antenna connection ports, each being capable of transmit and receive.

Alternatively, as shown in FIG. 12B, the enhanced transceiver card 1203 supports four ports (which presently does not exist today): Antenna 1 Vertical polarization, both transmit and receive 1210; Antenna 1 Horizontal polarization, both transmit and receive 1211; Antenna 2 Vertical polarization, both transmit and receive 1212; Antenna 2 Horizontal polarization, both transmit and receive 1213.

Figure 12C:
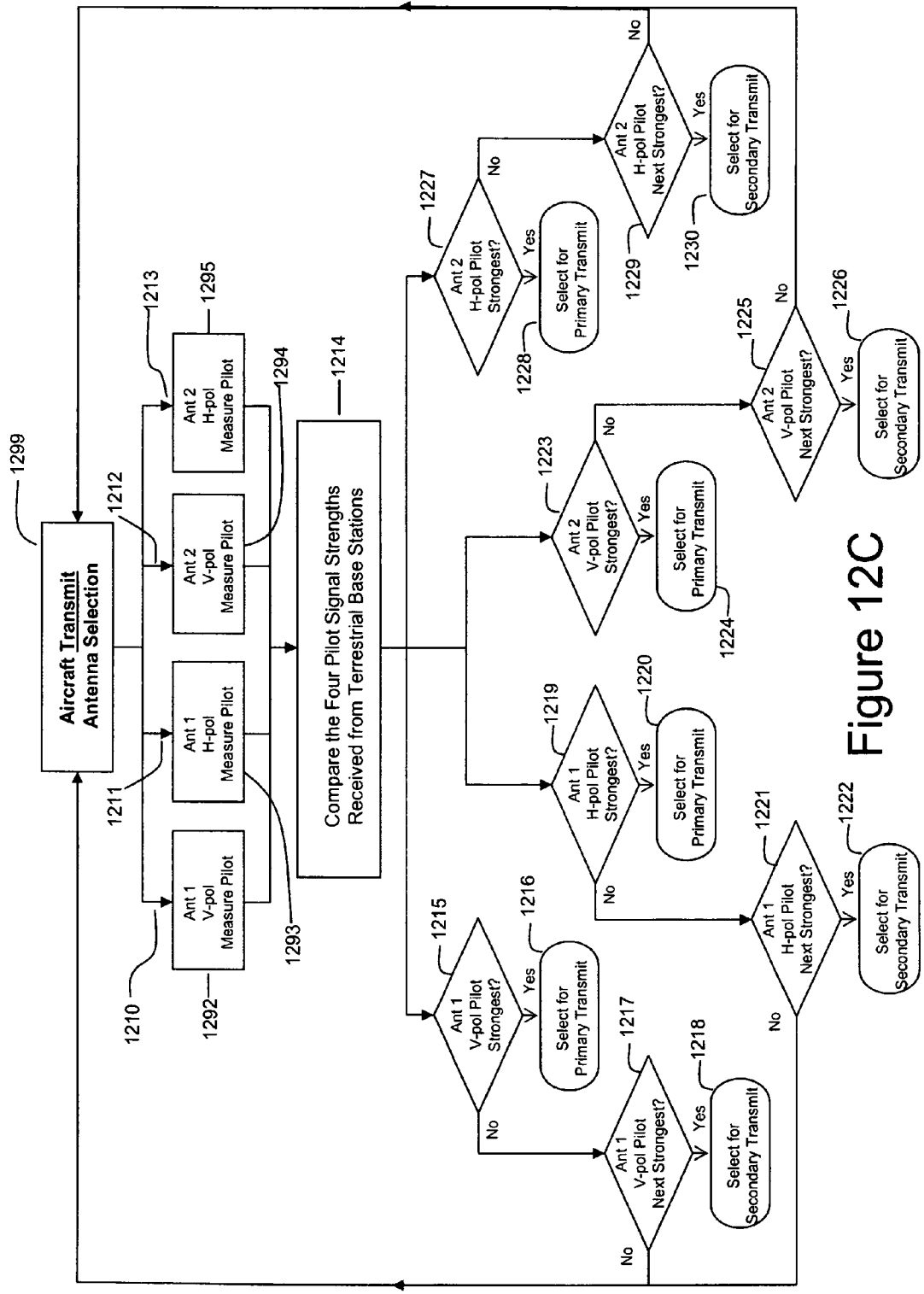
FIG. 12C illustrates, in block diagram form, the system for managing the selection of the transmit antenna on the aircraft as a function of received pilot signal strengths from base station sectors (FIG. 12C processes are in conjunction with the processes of FIGS. 12D and 12E)
Figure 12D:
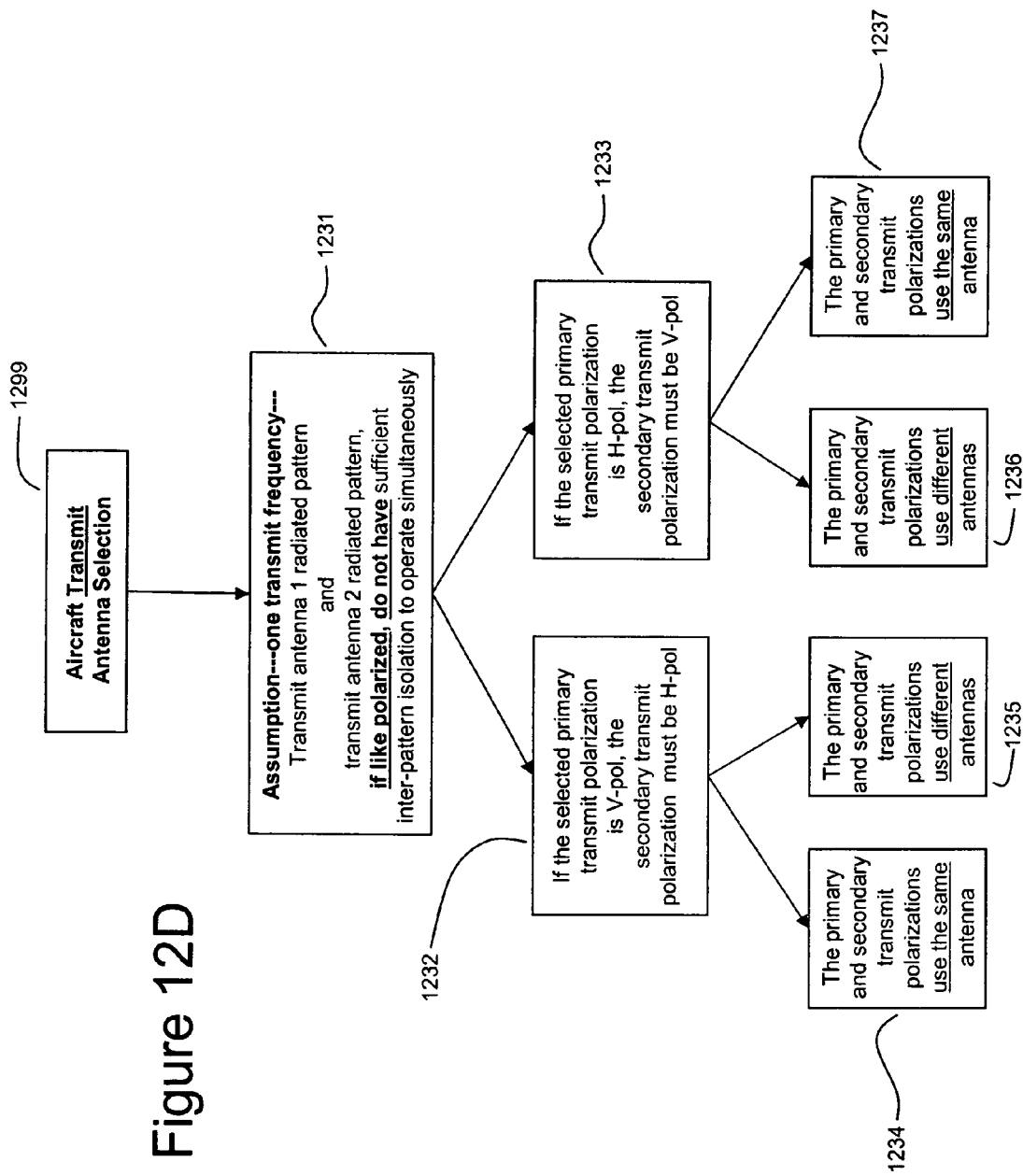
FIGS. 12D and 12E are in conjunction with the processes of FIG. 12C and illustrate the selection of the transmit aircraft radiator polarization and antenna for the transmission of Radio Frequency signals.
Figure 12E:
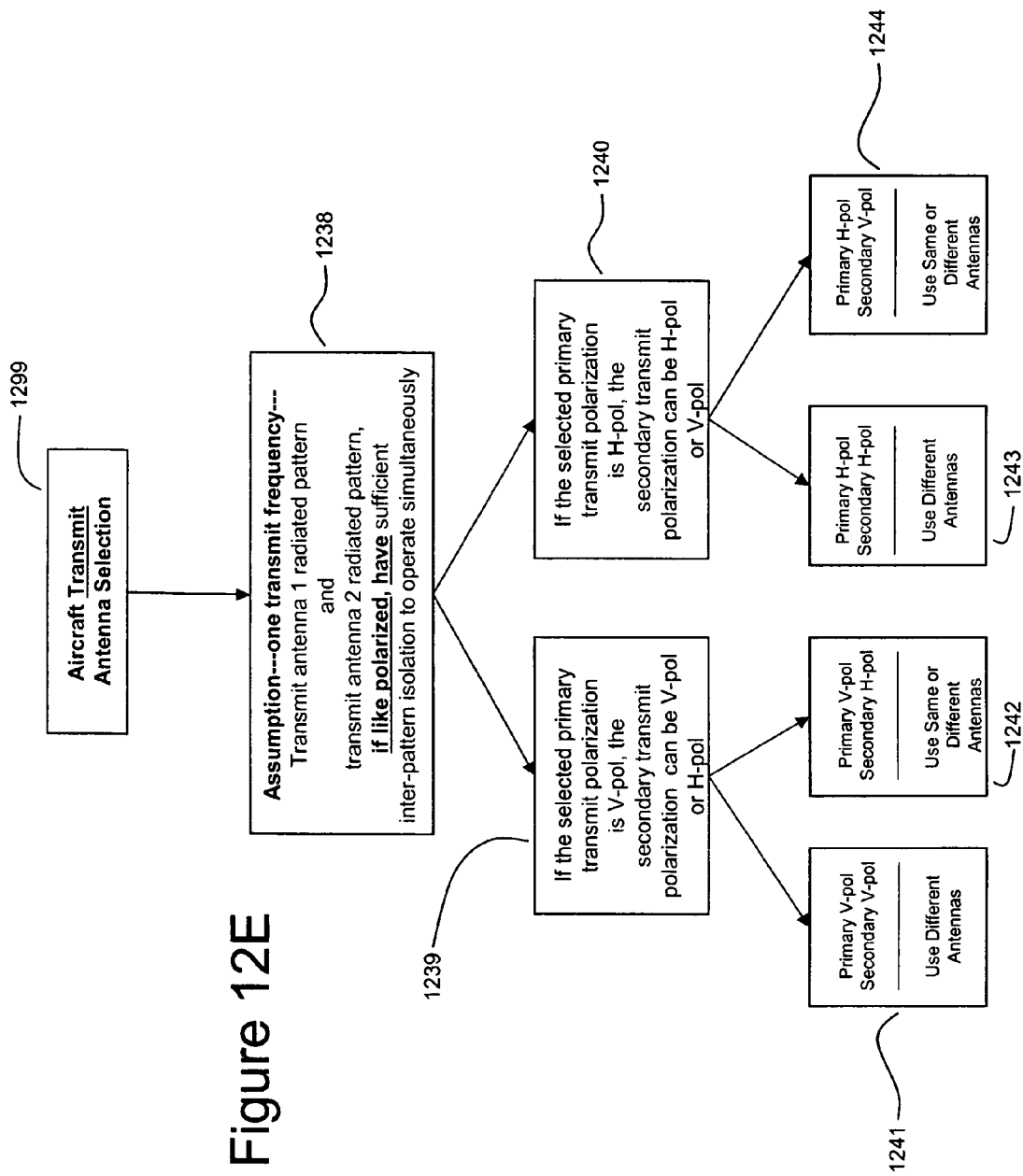

FIGS. 12C-12E illustrate, in block diagram form the system process for managing the selection of the aircraft transmit antenna. There are three logical diagrams that manage the selection of the aircraft transmit antenna and each diagram starts at step 1299 (FIGS. 12C, 12D, and 12E). These three processes operate generally in parallel. At step 1299 on FIG. 12C, the process is initiated, where the processor on the aircraft begins the selection of the antennas and polarizations to serve as the transmitting antennas and polarizations to implement the Air-To-Ground Radio Frequency communications links to selected Air-To-Ground terrestrial Base Transceiver Stations (BTS's). There is a plurality of Pilot signal measurement processes that are operational, one for each antenna and Radio Frequency signal polarization combination. In this example, there are two antennas (Antenna 1, Antenna 2) and two Radio Frequency signal polarizations (Horizontal, Vertical, which results in four processes that are used to measure the Pilot Signal strength at 1292, 1293, 1294, and 1295 which come from antennas/polarizations 1210, 1211, 1212, and 1213, respectively. These processes can operate in parallel, interleaved, or in series. In any case, each Pilot signal measurement processes returns results to the Pilot signal comparison process at 1214, which compares the Pilot signals for each combination of aircraft antenna and Radio Frequency signal polarization as received from all of the Air-To-Ground terrestrial base stations in range.

At steps 1215 through and including 1230, the determination is made of which antenna and Radio Frequency signal polarization results in the strongest Pilot signal and second strongest Pilot signal. The strongest Pilot signal determination causes that combination of aircraft antenna and Radio Frequency signal polarization to be the Primary Transmitter antenna and associated polarization selection. The second strongest Pilot signal determination causes that combination of aircraft antenna and Radio Frequency signal polarization to be the Secondary Transmitter antenna and associated polarization.

The transmit antenna and associated polarization selection process described in FIG. 12C is a continuous one where the system is seeking the optimum transmission path from the aircraft not just as a single node but is also considering the overall network traffic load (i.e., how many aircraft are being served by a given cell-sector), and the composite network has an overall optimization algorithm for the network in its local, regional, and national perspective. In particular, the composite network optimization algorithm ensures fairness and Quality of Service (QoS) among all the aircraft vying for network communication resources.

FIGS. 12D and 12E illustrate additional logical rules for aircraft transmit antenna and associated polarization selection. In particular, these two logical selection rule sets relate to whether or not the two installed antennas have spatial isolation. However, this concept is not limited to two antennas. An example of spatial isolation would be the intra-aircraft antenna pattern self-isolation that an antenna mounted on the aft-tail fuselage side of the aircraft would have with respect to a forward-starboard fuselage side mounted antenna. If these antennas have antenna pattern spatial separation, then another element of capacity enhancement has been created, since both aircraft antennas could potentially transmit on the same polarization at the same time without causing self-interference to each other.

FIG. 12D is the logical process taken if the two aircraft transmit antennas do not have sufficient inter-pattern isolation (step 1231). Then, at steps 1232 and 1233, the selected primary and secondary transmit polarizations must be substantially orthogonal; e.g., if the primary polarization is V-pol, the secondary polarization must be H-pol. Then, at steps 1234, 1235, 1236, and 1237, the system makes the determination if the requisite secondary orthogonal polarization is on the same physical antenna as the primary polarization or if the secondary polarization is connected to the other, second antenna.

FIG. 12E is the logical process if the two transmit antennas do have sufficient inter-pattern isolation at step 1238. In this case, at steps 1239 and 1240, the secondary polarization can be the same as the primary polarization, or it could be orthogonal to the primary polarization. If the selected primary and secondary polarizations are the same at steps 1241 and 1243, the selected antenna must be different. If the selected primary and secondary polarizations are different (or orthogonal, the selected antenna can be the same or different.

Figure 12F:
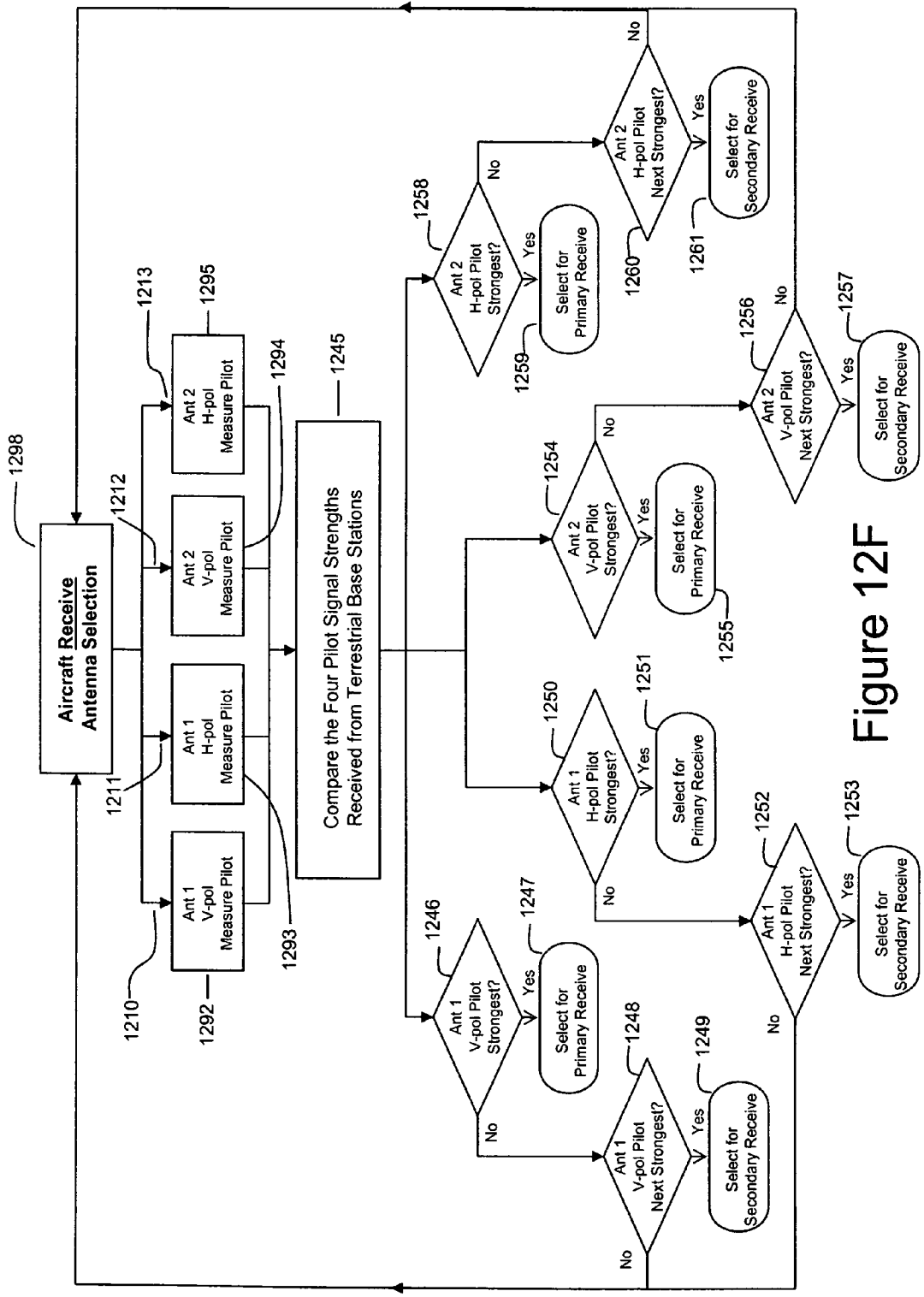
FIG. 12F illustrates, in block diagram form, the system for managing the selection of the receive antenna on the aircraft as a function of received pilot signal strengths from base station sectors.
Figure 12G:
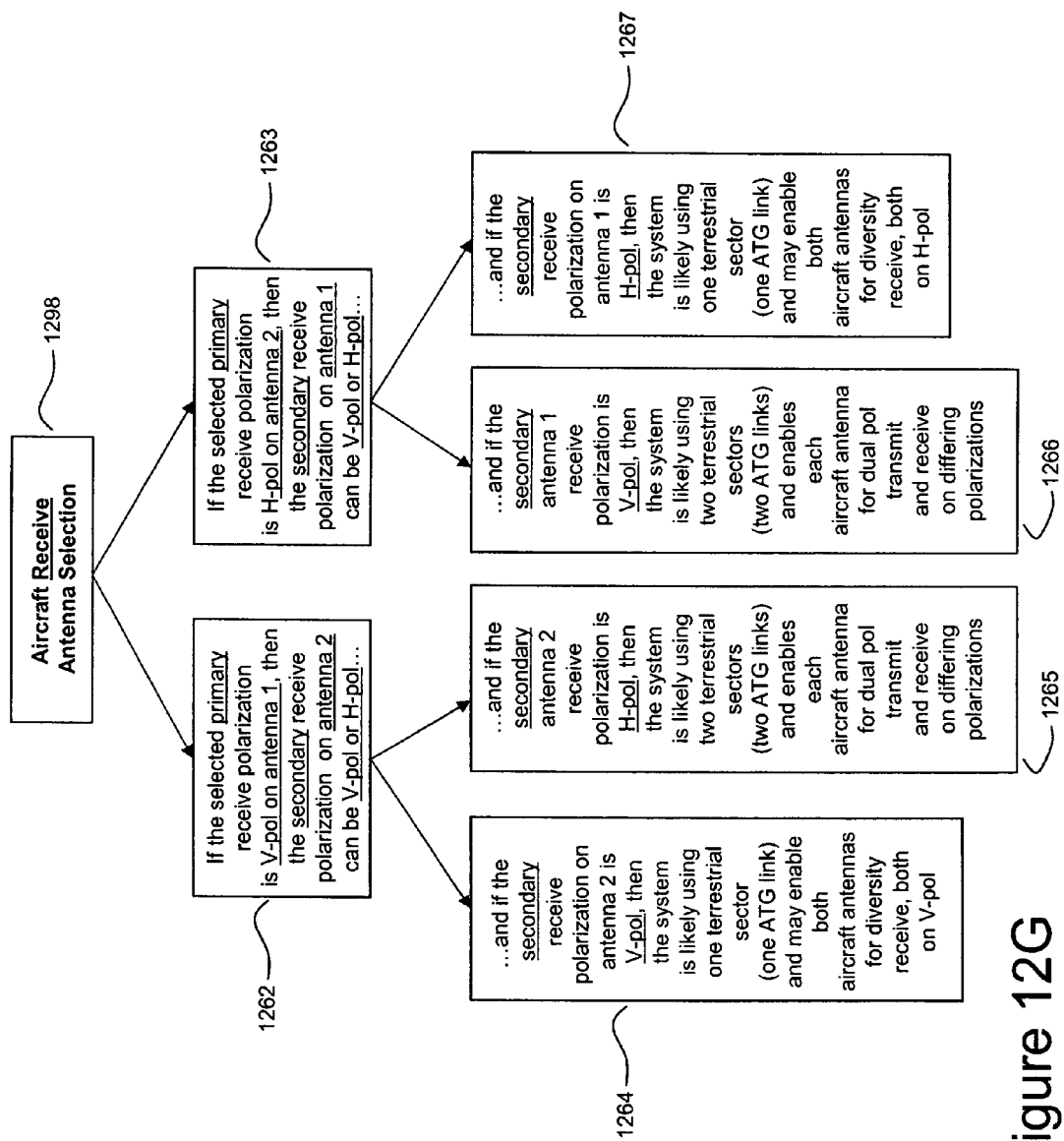
FIG. 12G is in conjunction with the processes of FIG. 12F and further describes the likely aircraft system level states, such as whether one Air-To-Ground link or two Air-To-Ground links are in place.

FIG. 12F illustrates, in block diagram form, the system for managing the selection of the receive antenna and associated polazation on the aircraft. There are two logical diagrams that manage the selection of the aircraft receive antenna and each diagram starts at step 1298 (FIGS. 12F and 12G). These two processes operate generally in parallel. At step 1298 on FIG. 12F, the process is initiated where the processor on the aircraft begins the selection of the antennas and polarizations to serve as the receiving antennas and polarizations to implement the Air-To-Ground Radio Frequency communications links to selected Air-To-Ground terrestrial Base Transceiver Stations (BTS's). There is a plurality of Pilot signal measurement processes that are operational, one for each antenna and Radio Frequency signal polarization combination. In this example, there are two antennas (Antenna 1, Antenna 2) and two Radio Frequency signal polarizations (Horizontal, Vertical), which results in four processes that are used to measure the Pilot Signal strength at 1292, 1293, 1294, and 1295, which come from antennas/polarizations 1210, 1211, 1212, and 1213, respectively. These processes can operate in parallel, interleaved, or in series. In any case, each Pilot signal measurement processes returns results to the Pilot signal comparison process at 1245, which compares the Pilot signals for each combination of aircraft antenna and Radio Frequency signal polarization as received from all of the Air-To-Ground terrestrial base stations in range.

At steps 1246 through and including 1261, the determination is made of which antenna and Radio Frequency signal polarization results in the strongest Pilot signal and second strongest Pilot signal. The strongest Pilot signal determination causes that combination of aircraft antenna and Radio Frequency signal polarization to be the Primary Receiver antenna and associated polarization selection. The second strongest Pilot signal determination causes that combination of aircraft antenna and Radio Frequency signal polarization to be the Secondary Receiver antenna and associated polarization.

The receive antenna and associated polarization selection process described in FIG. 12F is a continuous one, where the system is seeking the optimum transmission path to the aircraft not just as a single node but is also considering the overall network traffic load (i.e., how many aircraft are being served by a given cell-sector), and the composite network has an overall optimization algorithm for the network in its local, regional, and national perspective. In particular, the composite network optimization algorithm ensures fairness and Quality of Service (QoS) among all the aircraft vying for network communication resources.

In general, the process of selecting receive and transmit antennas and associated polarizations will often result in the receive and transmit antenna/polarization being matched, i.e., the same. However, this is not necessarily always the case. In particular, other systems level processes may decide that the traffic profile for a given aircraft is unbalanced in the forward (base to aircraft) and reverse (aircraft to base) paths. In this case, the system may elect to have two receive antennas and associated polarizations but only one transmit antenna and associated polarization. In this example, the forward path has a higher traffic load than the reverse path.

FIG. 12G illustrates the receive antenna and associated polarization selection starting at 1298. The process flows through steps 1262 and 1263 to 1264 through and including 1267. Conceptually, if the selected receive polarizations for two different antennas are the same, it is highly likely that both aircraft antennas are receiving information from the same BTS generated sector. In this case, at 1264 and 1267, the EVDO CDMA receiver uses these two receive inputs as a spatial diversity receive, thereby enhancing the composite receive signal quality through differing time of arrival diversity. If the selected receive polarizations are different and substantially orthogonal (in steps 1265 and 1266), the aircraft is likely connected to two separate sectors for receive and has two distinct links in operation.

Figure 12H:
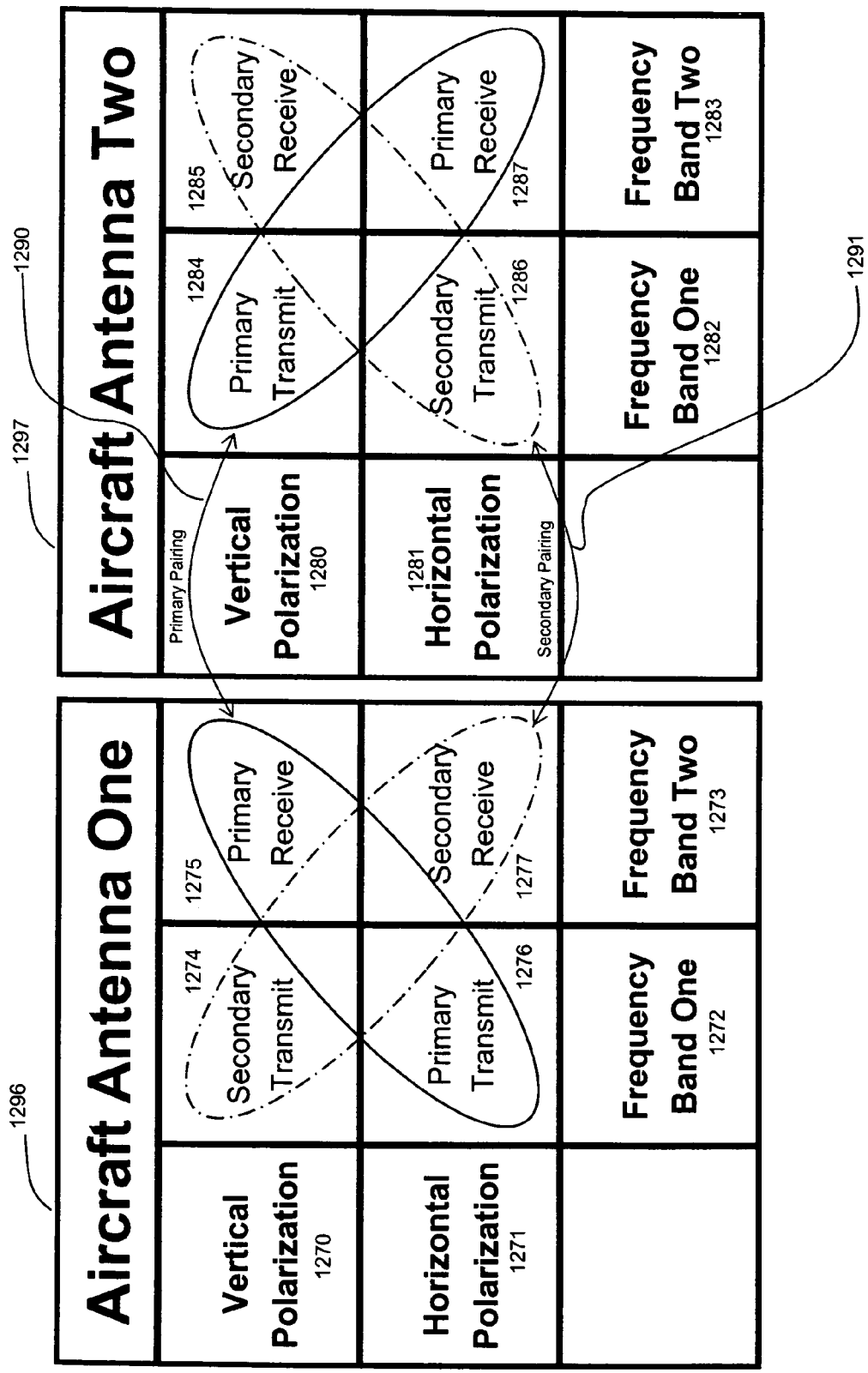
FIG. 12H illustrates the possible matrix combinations between the aircraft antenna, polarization, and frequency domains (FIG. 12H further shows, in example form, the primary and secondary pairings of the three domains necessary to enable two simultaneous Air-To-Ground links without causing self-interference.

FIG. 12H illustrates the possible combinations of which antenna (1 and/or 2), which polarization (V-pol or H-pol), which frequency band (One or Two), and which state of operation (Primary or Secondary). While this diagram shows two antennas on the aircraft there is nothing that technologically prevents extending this diagram to more than two aircraft antennas. It is important to understand that each axis of these diagrams has substantial self-isolation, both in the polarization domain as well as in the frequency domain. This self-isolation enables capacity enhancement. There are two general aircraft antenna system element pairings, the Primary Pairing shown in 1290 and the Secondary Pairing shown in 1291. These two pairings have substantial self isolation and, in general, either the Primary Pairing or the Secondary Pairing is operating, but not both at the same time; the Pairings are generally exclusive of the other (i.e., generally mutually exclusive UNLESS the aircraft antenna patterns have spatial isolation discussed earlier herein; then the Primary and Secondary Pairings could potentially operate simultaneously). The Primary Pairing 1290 shown as two solid ellipses covering the requisite matrix row-column "cells" has the following attributes: for Antenna One 1296, Primary Transmit 1276 is on H-pol 1271 and Band One 1272, while Primary Receive 1275 is on V-pol 1270 and Band Two 1273; for Antenna Two 1297, Primary Transmit 1284 is on V-pol 1280 and Band One 1282, while Primary Receive 1287 is on H-pol 1281 and Band Two 1283. A conceptually similar antenna-polarization-band mapping can be done for the Secondary Pairing 1291 shown as contained within the two dotted-dashed ellipses.

Figure 13:
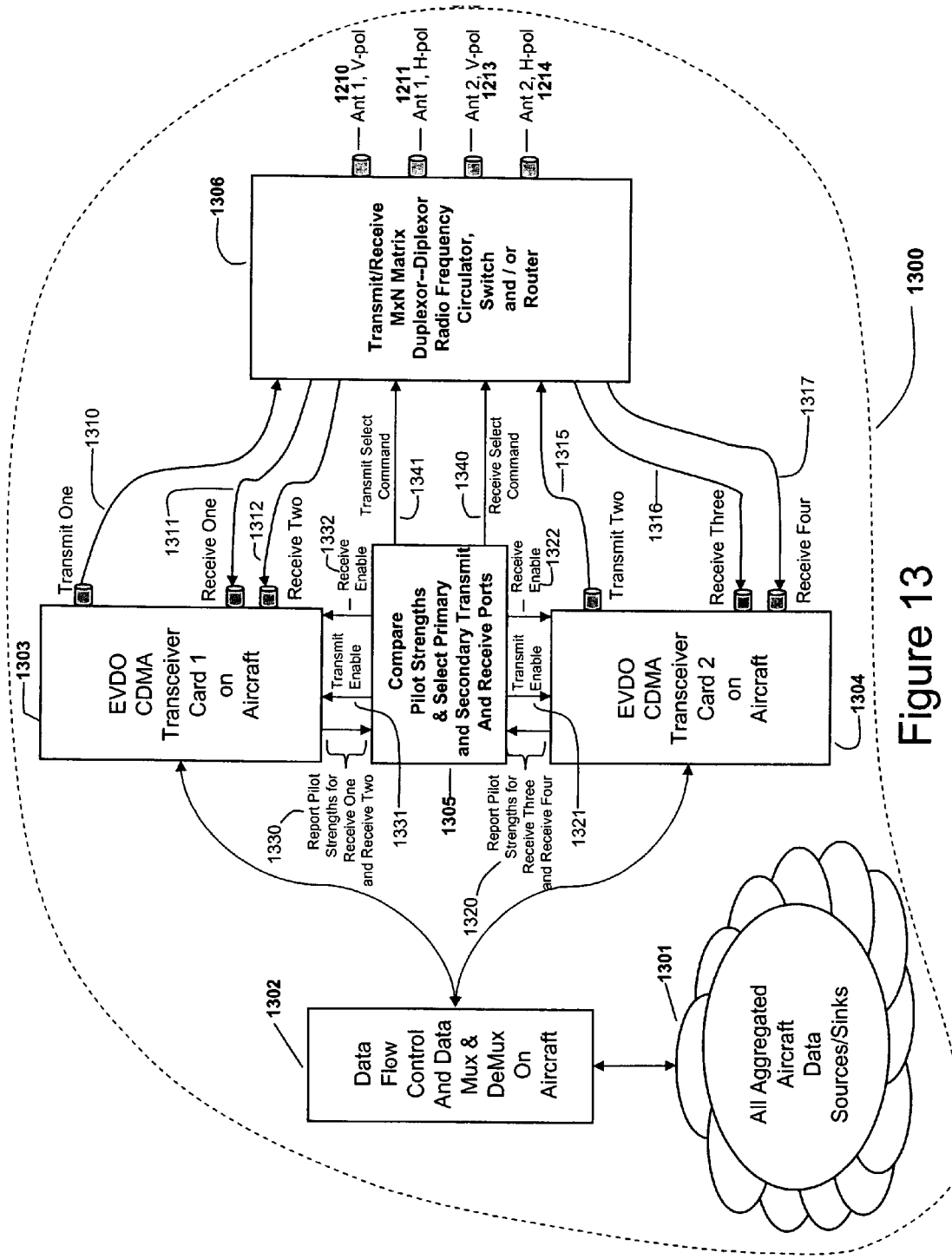
FIG. 13 illustrates, in block diagram form the key building blocks onboard the aircraft to enable dual antenna, dual polarization, multi-link capability using two transceiver cards, largely unmodified.

FIG. 13 illustrates one embodiment of the aircraft electronics systems as interconnected building blocks 1300. The aircraft data source/sink 1301 is bi-directionally connected to 1302, which is the data flow control and mux-demux. The "mux-demux" functionality is also known as the "inverse multiplexing" functionality which, on the aircraft, recombines data from two separate receive multi-link paths. It also allocates aircraft transmit data between the two transceivers 1303 and 1304 based on traffic load management and link quality metrics algorithms residing in the aircraft electronics in conjunction with signaling information from the terrestrial network (for balancing traffic load among multi-aircraft and multiple sectors on a network wide basis). The data flow control, mux-demux device 1302 is bi-directionally connected to EVDO CDMA transceiver one 1303 and transceiver two 1304. A processor 1305 is bi-directional to transceivers 1303 and 1304. This processor 1305 performs pilot strength measurement comparisons or other link quality metric measurements, makes intelligent decisions concerning the primary and secondary transmit and receive port selections, and sends selection commands to transceivers 1303 and 1304 as well as to 1306, the M×N Radio Frequency transmit-receive matrix. Device 1306 performs the functions of a duplexor (separates receive and transmit directional paths), diplexor (connects multiple RF signals to the same transmit antenna), circulator, switch and/or router of RF signals, and connects antenna ports 1210 through 1213 to transceiver ports 1310 through 1312 and transceiver ports 1315 through 1317, all as instructed by device 1305. Device 1306 is governed by logical rules such as those defined in FIGS. 12C, 12D, 12E, 12F, 12G, and 12H and by instructions from 1305.

FIG. 14A1 illustrates the inverse multiplexing functionality operating in the Air-To-Ground (Ground-To-Air) network Aircraft electronics system 1300 is connected to aircraft antennas 1401 and 1402 which communicate to terrestrially located antennas 1420 and 1421 through paths 1405, 1406 and 1410, 1411. Terrestrial antennas 1420 and 1421 are connected to BTS's 1431 and 1430, respectively.

Note that, in this FIG. 14A1 embodiment, terrestrial antenna 1420 "Cell Antenna Five, Sector Alpha" is dual orthogonal linear polarized; this is similarly true for terrestrial antenna 1421. For certain wireless technologies or architectures, this may be the preferred approach. However, FIG. 14A2 illustrates another embodiment where the terrestrial antenna sectors are single polarization, for both receive and transmit, where receive and transmit frequencies are substantially different. For certain deployed technology types such as CDMA EVDO, FIG. 14A2 is the preferred approach to manage self-interference (and this approach uses the sectorization schemes shown in the FIG. 9 series and FIG. 10 series herein.

Figure 14B:
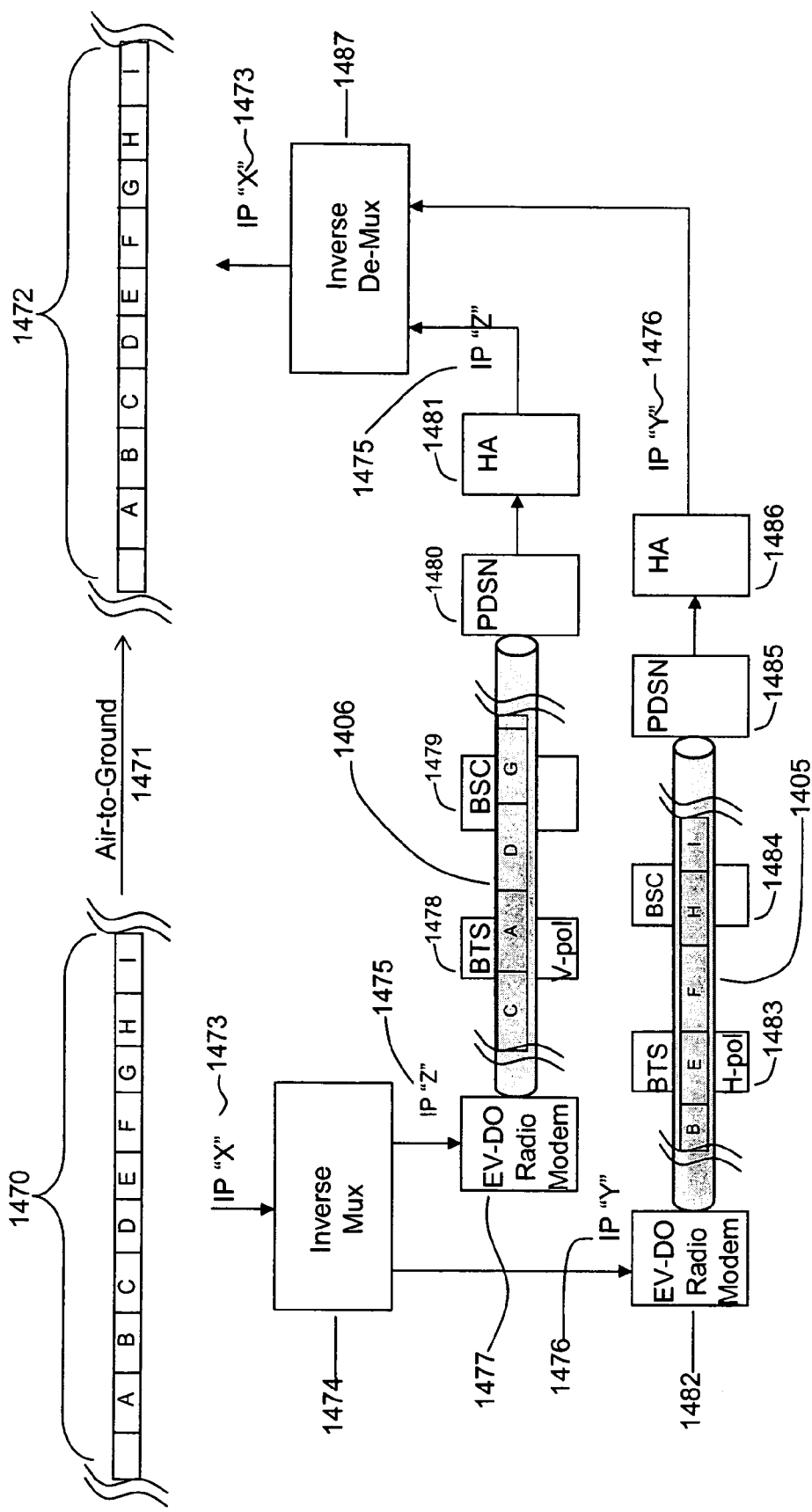
FIG. 14B illustrates the connection between the aircraft radio modems and the terrestrial PDSN (Packet Data Switched Network) and HA (Home Agent) to show how a single QoS (Quality of Service) can be transmitted in the Air-To-Ground direction via two wireless multi-links and then recombined into an identical replica of the original data stream (which originated on the aircraft)

Continuing with the FIG. 14A1 description, these BTS's 1430 and 1431 are further connected to network 1435 to BSC Two 1436. Network 1435 can provide the inverse multiplexing functionality in addition to being a connective network Alternatively, the inverse multiplexing function can be slid further downstream at the output of the BSC (as shown in FIG. 14A2). However, while this approach of moving the inverse multiplex function after the BSC may be advantageous to minimize the amount of "non-standard" equipment used (the BTS and BSC interconnection protocol is often proprietary, if FIG. 14A1 had multiple BSCs in the inverse multiplex path, these BSCs would then have to connect with each other to re-assemble packet data streams through means described in FIG. 14B. Continuing with the connection description of FIG. 14A1, the BSC 1436 is connected to the public network 1437, which is terrestrially located. The output of 1437 is a perfectly reassembled data stream 1441 that was sent from the aircraft via multiple wireless paths. Nothing described herein limits the number of paths between the aircraft to the ground (and the ground to the aircraft) to only two wireless links. Conceptually, the only limitation to the number of wireless links is the degrees of freedom (code, space, time, polarization, and so on) available to the systems designer to create self-isolation between each unique wireless path.

Completing the discussion of FIG. 14A1, the Air-To-Ground connection paths are 1405 and 1406. Within these air interface data streams, the original packets sourced at 1300 are sent to the ground out of sequence on two separate RF links, 1405 and 1406. When this out-of-sequence data arrives at network 1435, in this particular embodiment, the out-of-sequence data is reassembled into the correct sequence and ultimately conveyed to 1441 in perfect, original order, packets A through I. Similarly, in the Ground-To-Air direction, air interface paths 1410 and 1411 provide multi-link communication from the ground to the aircraft. At 1440, the data at the output of 1300 is reassembled in correct order, packets 1 through 9.

In FIG. 14A2, this illustration is more specific to an EVDO CDMA implementation. This illustrated architecture endeavors to re-use as much of the standard EVDO platform with minimal modification to shorten the time to market as well as the cost to develop and deploy a nationwide or continent-wide operating network While there are similarities between FIGS. 14A1 and 14A2, the key differences shown in FIG. 14A2 are important to efficiently deploy an Air-To-Ground (Ground-To-Air) network using EVDO by added technological elements in and around the existing EVDO standard to realize multi-link inverse multiplex functionality. Starting at the aircraft, building block 1450 has the functions of Data Source/Sink-Data Flow Control-Data Inverse Mux. Device 1450 bi-directionally connects to two RF transceivers 1451 and 1452, described herein as Aircraft Radio Modem One and Aircraft Radio Modem Two, respectively. These Modems are interconnected to two aircraft antennas, 1453 and 1454. At 1465, each aircraft antenna can receive both polarizations from the base station or cell antennas 1455 and 1456. Unless the aircraft antennas have radiated transmit pattern isolation, each aircraft antenna would transmit on substantially orthogonal polarizations, i.e., one Modem would be transmitting V-pol and the other Modem would be transmitting H-pol. These transmit polarization assignments are dynamic and change as the aircraft flies from one region of space to another as described herein. Paths 1405 and 1406 are in the Air-To-Ground direction. Conversely, paths 1410 and 1411 are in the Ground-To-Air direction. Cell Antenna Six, Sector Gamma 1455 has both antenna ports configured as V-pol. The V-pol transmit (Tx) port is 1466 and the receive port, also V-pol, is labeled 1467 (Rx). A similar configuration is established for 1456, Cell Four Sector Delta, but this particular sector is horizontally polarized for both receive and transmit ports, 1469 and 1468, respectively. Conceptually, terrestrial antenna sector patterns 1455 and 1456 are spatially adjacent, either in azimuth, elevation, or both, but with 1455 being vertically polarized and 1456 being horizontally polarized. The concept of spatially adjacent sectors is depicted in the FIG. 9 series and FIG. 10 series herein. Thus, at the spatial boundary of these two terrestrial antenna sectors 1455 and 1456, there is 12 dB to 15 dB of polarization isolation realized at the aircraft antennas, 1453 and 1454.

Antenna 1455 is connected to BTS Two 1458 and antenna 1456 is connected to BTS three 1457. Both BTS's, 1457 and 1458, are bi-directionally connected through network 1459 to BSC One 1460. Continuing, 1460 is connected through network 1461 to device 1462. Device 1462 contains PDSN (Packet Data Switched Network), HA (Home Agent), and Inverse Mux (Inverse Multiplexing) capability. The output of 1462 is the fully reassembled data stream sent by the aircraft and is shown at 1463.

Since this multi-link network is bi-directional, aircraft device 1450 outputs data sent from the ground at 1464 as a fully reassembled data stream. This data stream 1464 is then conveyed inside the aircraft cabin (or to aircraft systems) as defined by packet addressing schemes well understood in the art. The data conveyed by the network can be data, voice, VoIP and so on.

FIG. 14B illustrates a more detailed architectural Quality of Service (QoS) Air-To-Ground 1471 path where data stream 1470 initiates at the aircraft and, through multi-link wireless transmission, the same data stream is transmitted to the ground and reassembled as 1472 via two links 1405 and 1406 (with associated equipment and processes). At the aircraft, data stream 1470 shown as IP "X" 1473 is delivered to Inverse Mux (Multiplexer) 1474 which outputs two data streams, IP "Y" and IP "Z", 1476 and 1475, respectively. Following the IP "Z" path, aircraft located EVDO Radio Modem 1477 is connected wirelessly to BTS 1478, which is further connected to BSC 1479 and onto PDSN 1480 to HA (Home Agent) 1481. The output of 1481 is 1475 IP "Z". Along a similar path, the IP "Y" data stream flows wirelessly from EVDO Modem 1482 to BTS 1483, then onto BSC 1484, and then onto PDSN 1485 through HA 1486 to re-emerge as the original data stream IP "Y" 1476. Both data streams, 1475 and 1476, are connected to Inverse De-Mux device 1487. Device 1487 outputs the data stream IP "X" 1473 as 1472. The transmission along this aggregate pathway is ultimately lossless; that is, whatever is transmitted at the aircraft ultimately arrives at the ground without errors or loss of packets.

The HA (Home Agent) is optional in the CDMA packet data networks. The CDMA packet data network architecture supports "Simple IP" and "Mobile IP" IP mobility models. Mobile IP is the traditional IP mobility model of the IETF (RFCs 2002-2006). The HA is the anchor point for the IP address used by the MT (Mobile Terminal). Since the MT is moving its point of attachment to the Internet, the routing networks are not able to route directly to the mobile. Instead, the HA provides the routing point for each IP address. The HA then tunnels the IP packets for a given IP address to the appropriate Foreign Agent (FA). When Mobile IP is used, the PDSN performs the FA functionality. If the mobile moves to a new FA (PDSN), mobile IP protocol takes care of updating its HA to point to the new FA The other option is to use Simple IP. With Simple IP, the PDSN provides the anchor point for the IP address. The PDSN, via DHCP or some similar capability, would assign IP addresses to the MTs when they established a packet data session. To the Internet routing infrastructure, the PDSN looks like the endpoint (or last router) for those IP addresses. If the MT moves across a cell boundary that causes it to be assigned to a new PDSN, then it must obtain a new IP address. With Mobile IP, there is another layer of mobility and the PDSN boundaries do not cause a change in IP address.

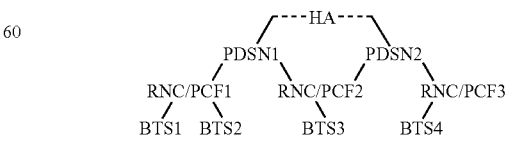

As shown above, if an MT moves from BTS2 to BTS3, it will still be served by the same PDSN. So with both Simple IP and Mobile IP, the MT will not have to be assigned a new IP address. However, if the MT moves from BTS3 to BTS4, it will change PDSNs. With Simple IP, this would require the assignment of a new IP address by PDSN2. With Mobile IP, the HA would still be the same and, therefore, no IP address assignment is needed. It would just update its pointer to point to PDSN2 instead of PDSN1. The rest of the Internet is unaware of the mobility as the routing tables all point to the HA.

Relative to the location of the inverse mux, the HA is the endpoint of a Mobile IP tunnel between the MT and HA This is why it would be easiest to keep the inverse mux on the outside of this tunnel. At the same time, the HA is a natural place to implement the inverse mux functionality since it is already the last endpoint before the big-I Internet.

In FIG. 14B, a single QoS flow is shown. However, multiple QoS flows are possible. In all cases, each QoS flow is established between the MT and PDSN. In addition, header compression and/or header removal is supported. The MT and PDSN are the end-points of the compressor/decompressor. For these reasons, it would require standards changes to insert an inverse mux function anywhere between the MT and PDSN.

Another function of the inverse-mux is to handle the mapping of multiple IP addresses back into the single IP address. Because of this, the inverse-mux would likely sit between the HA and Internet. Since the two HAs in most deployments would be the same physical entity, the HA would be a good candidate for implementing the inverse-mux functionality.

Although the two PDSNs in FIG. 14B are shown as separate logical entities, in many cases they would be a single physical network element. The same holds true for the HA.

Figure 14C:
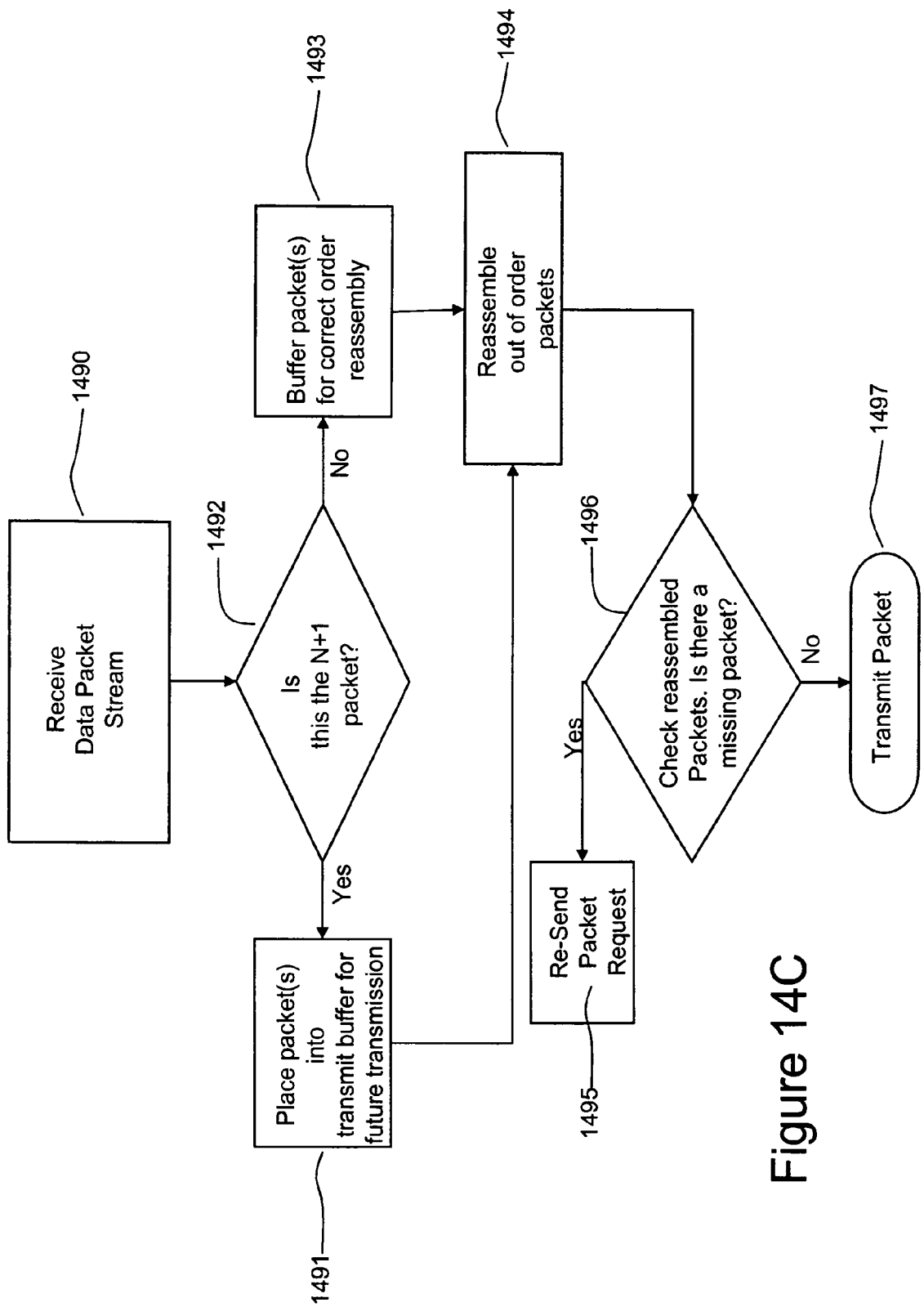
FIG. 14C illustrates a simplified process of how inverse multiplexing conceptually operates.

FIG. 14C illustrates a simplified inverse multiplex protocol. At 1490, the data stream is received, albeit with packets out of order and possibly some packet missing. At 1492, the protocol checks to see if the packet is the N+1 packet, or the next packet in the sequence. If it is, the packet is sent to transmit buffer 1491; if it is not in order, the packet is sent to 1493. At 1494, packets are reassembled into the correct order. At 1496, a check is performed one last time for any missing packets before data stream transmission to 1497. If packets are missing, a request at 1495 is sent to re-send the missing packet(s).

Inverse Multiplexing

With multiple EV-DO modems, it is necessary to provide an inverse-multiplexing function to combine the two EV-DO streams. Inverse multiplexing takes data from a single channel and distributes is across multiple smaller channels where it is reassembled at the other end. Although Multi-Link PPP has been used to combine multiple stable channels (e.g., logical ISDN channels), it would not be appropriate for multiple EV-DO links due to the dynamic nature of the links. The inverse-multiplexing function must take into account the instantaneous state of each link This problem has been well studied, and several systems have been prototyped. The inverse-multiplexing protocols typically require logic at each end of the links.

Inverse multiplexing must consider factors such as scheduling, missing packets, order of arrival, packet latency, and so on. In addition, aggregate network load balancing algorithms need to provide control functionality for fairness and Quality of Service (QoS). In conjunction with all of these variables, the system must continually measure the effective throughput of any given link in particular, as it compares to the overall needs of multiple aircraft in the composite network Summary The present Multi-Link Aircraft Cellular System makes use of multiple physically separated antennas mounted on the aircraft, as well as the use of additional optional signal isolation and optimization techniques to improve the traffic (data and voice) handling capacity of the Air-To-Ground cellular communications network through inverse multiplexing. Additional techniques in the Multi-Link Aircraft Cellular System can include polarization domain, code domain, and ground antenna pattern shaping (in azimuth, in elevation, or in both planes).

What is claimed as new and desired to be protected by Letters Patent of the United States is:

1. A system for managing radio frequency communications in a non-terrestrial region of space between a plurality of wireless subscriber devices located in an aircraft and a plurality of Air-To-Ground terrestrial base stations of an Air-To-Ground cellular communications network, comprising:
    a plurality of Air-To-Ground terrestrial base stations of said Air-To-Ground cellular communications network for populating said non-terrestrial region of space with a plurality of multi-dimensional Radio Frequency sectors, each multi-dimensional Radio Frequency sector having a plurality of radio frequency characteristics, to exchange call traffic with an aircraft;
    a plurality of independently operable radio frequency antennas mounted on the exterior surface of said aircraft;
    interface, located in said aircraft, for generating radio frequency communication signals for selected ones of said plurality of independently operable antennas to establish multiple simultaneous Air-To-Ground Radio Frequency communications links to exchange call traffic between said plurality of wireless subscriber devices and a plurality of cells and sectors of said Air-To-Ground cellular communications network;
    data flow controller, located in said aircraft, comprising:
        traffic determination process for determining the traffic load in said aircraft,
        network signaling process for receiving terrestrial network load balancing information received from said Air-To-Ground cellular communications network, and
        data router, responsive to said determined traffic load and said received network traffic load balancing information, for distributing said call traffic from said plurality of wireless subscriber devices among said plurality of radio frequency antennas to simultaneously maintain multiple Air-To-Ground Radio Frequency communications links, each link serving a portion of said call traffic from said plurality of wireless subscriber devices.

2. The system for managing radio frequency communications of claim 1, said data flow controller further comprising:
    pilot signal determining process, located in each of said aircraft, for measuring a pilot signal strength at each of said plurality of radio frequency antennas; and
    link selector, responsive to said determined pilot signal strengths, for activating said data router to apply radio frequency signals to said selected ones of said aircraft radio frequency antennas with radio frequency signals to match said plurality of radio frequency characteristics of said corresponding multi-dimensional Radio Frequency sectors.

3. The system for managing radio frequency communications of claim 2 wherein said plurality of Air-To-Ground terrestrial base stations comprises:
    sector generator for generating a pattern of radio frequency signals that divides said multi-dimensional space into multi-dimensional Radio Frequency sectors in one of azimuth, elevation, altitude, and multiple planes.

4. The system for managing radio frequency communications of claim 3 wherein said plurality of radio frequency characteristics are selected from the set of characteristics that include: Time, Space, Code, Polarization, Antenna-Aircraft, Antenna-Ground, Frequency, Azimuth Sectoring, Elevation Sectoring, Pitch, Roll, Yaw, and Flight Speed.

5. The system for managing radio frequency communications of claim 1 wherein said plurality of Air-To-Ground terrestrial base stations comprises:
sector generator for generating a pattern of radio frequency signals that divides said multi-dimensional space into multi-dimensional Radio Frequency sectors in one of azimuth, elevation, altitude, and multiple planes.

6. The system for managing radio frequency communications of claim 1 wherein said data flow controller comprises:
logical path link for transmitting a first part of said call traffic on a first of said multiple Air-To-Ground Radio Frequency communications links and a second part of said call traffic on a second of said multiple Air-To-Ground Radio Frequency communications links, wherein individual data packets in said call traffic are not time synchronous.

7. The system for managing radio frequency communications of claim 1, said data flow controller further comprising:
pilot signal determining process, located in each of said aircraft, for measuring a pilot signal strength at each of said plurality of radio frequency antennas; and
primary link selector, responsive to said determined pilot signal strengths, for selecting a primary one of said plurality of radio frequency antennas and associated polarization that corresponds to a strongest pilot signal strength.

8. The system for managing radio frequency communications of claim 7, said data flow controller further comprising:
secondary link selector, responsive to said determined pilot signal strengths, for selecting a secondary one of said plurality of radio frequency antennas and associated polarization that corresponds to a second strongest pilot signal strength.

9. A method for managing radio frequency communications in a non-terrestrial region of space between a plurality of wireless subscriber devices located in an aircraft and a plurality of Air-To-Ground terrestrial base stations of an Air-To-Ground cellular communications network, comprising:
populating, using a plurality of Air-To-Ground terrestrial base stations of said Air-To-Ground cellular communications network, said non-terrestrial region of space with a plurality of multi-dimensional Radio Frequency sectors, each multi-dimensional Radio Frequency sector having a plurality of radio frequency characteristics, to exchange call traffic with an aircraft;
operating a plurality of independently operable radio frequency antennas mounted on the exterior surface of said aircraft;
generating, in said aircraft, radio frequency communication signals for selected ones of said plurality of independently operable antennas to establish multiple simultaneous Air-To-Ground Radio Frequency communications links to exchange call traffic between said plurality of wireless subscriber devices and a plurality of cells and sectors of said Air-To-Ground cellular communications network;
controlling data flow in said aircraft, comprising:
determining the traffic load in said aircraft,
receiving terrestrial network load balancing information received from said Air-To-Ground cellular communications network, and
distributing, in each of said aircraft, responsive to said determined traffic load and said received network traffic load balancing information said call traffic from said plurality of wireless subscriber devices among said plurality of radio frequency antennas to simultaneously maintain multiple Air-To-Ground Radio Frequency communications links, each link serving a portion of said call traffic from said plurality of wireless subscriber devices.

10. The method for managing radio frequency communications of claim 9, said step of controlling data flow further comprising:
measuring, in each of said aircraft, a pilot signal strength at each of said plurality of radio frequency antennas; and
activating, in response to said determined pilot signal strengths, said step of distributing to apply radio frequency signals to said selected ones of said aircraft radio frequency antennas with radio frequency signals to match said plurality of radio frequency characteristics of said corresponding multi-dimensional Radio Frequency sectors.

11. The method for managing radio frequency communications of claim 10 wherein said step of populating comprises:
generating a pattern of radio frequency signals that divides said multi-dimensional space into multi-dimensional Radio Frequency sectors in one of azimuth, elevation, altitude, and multiple planes.

12. The method for managing radio frequency communications of claim 11 wherein said plurality of radio frequency characteristics are selected from the set of characteristics that include: Time, Space, Code, Polarization, Antenna-Aircraft, Antenna-Ground, Frequency, Azimuth Sectoring, Elevation Sectoring, Pitch, Roll, Yaw, and Flight Speed.

13. The method for managing radio frequency communications of claim 9 wherein said step of populating comprises:
generating a pattern of radio frequency signals that divides said multi-dimensional space into multi-dimensional Radio Frequency sectors in one of azimuth, elevation, altitude, and multiple planes.

14. The method for managing radio frequency communications of claim 9, said step of distributing further comprising:
transmitting a first part of said call traffic on a first of said multiple Air-To-Ground Radio Frequency communications links and a second part of said call traffic on a second of said multiple Air-To-Ground Radio Frequency communications links, wherein individual data packets in said call traffic are not time synchronous.

15. The method for managing radio frequency communications of claim 9, said step of controlling data flow further comprising:
measuring, in each of said aircraft, a pilot signal strength at each of said plurality of radio frequency antennas; and
selecting, in response to said determined pilot signal strengths, a primary one of said plurality of radio frequency antennas and associated polarization that corresponds to a strongest pilot signal strength.

16. The method for managing radio frequency communications of claim 15, said step of controlling data flow further comprising:
selecting, in response to said determined pilot signal strengths, a secondary one of said plurality of radio frequency antennas and associated polarization that corresponds to a second strongest pilot signal strength.

17. The system for managing radio frequency communications of claim 1 wherein said data router comprises:

data multiplexor for recombining data received from multiple Air-To-Ground Radio Frequency communications links into a single data flow.

18. The system for managing radio frequency communications of claim 1 wherein said data router comprises:

data multiplexor for dividing data received from a single data flow onto multiple Air-To-Ground Radio Frequency communications links.

19. The method for managing radio frequency communications of claim 9 wherein said step of selectively applying comprises:

recombining data received from multiple Air-To-Ground Radio Frequency communications links into a single data flow.

20. The method for managing radio frequency communications of claim 9 wherein said step of selectively applying comprises:

dividing data received from a single data flow onto multiple Air-To-Ground Radio Frequency communications links.

* * * * *